United States Patent [19]

Sabert et al.

[11] Patent Number: 5,793,732
[45] Date of Patent: Aug. 11, 1998

[54] OPTICAL APPARATUS HAVING REFLECTING PORTON SPLIT BY AN EDGE

[75] Inventors: Hendrik Sabert; Masato Doi, both of Kanagawa, Japan

[73] Assignee: Sony Corporation, Tokyo, Japan

[21] Appl. No.: 605,504

[22] Filed: Feb. 26, 1996

[30] Foreign Application Priority Data

Feb. 24, 1995 [JP] Japan .................. 7-037017

[51] Int. Cl.$^6$ .................................................. G11B 7/00
[52] U.S. Cl. .................. 369/112; 369/44.12; 369/44.24
[58] Field of Search ..................... 369/109, 110, 369/112, 44.11, 44.12, 44.15, 44.23, 44.37, 121, 13, 20, 44.14

[56] References Cited

U.S. PATENT DOCUMENTS

| | | | |
|---|---|---|---|
| 4,823,331 | 4/1989 | Yoshitoshi et al. | 369/112 X |
| 4,971,414 | 11/1990 | Funato et al. | 369/112 X |
| 5,097,464 | 3/1992 | Nishiuchi et al. | 369/112 |
| 5,444,677 | 8/1995 | Hosokawa et al. | 369/112 X |
| 5,446,719 | 8/1995 | Yoshida et al. | 369/112 X |
| 5,465,247 | 11/1995 | Kobayashi | 369/112 X |
| 5,515,353 | 5/1996 | Miyazaki et al. | 369/112 |
| 5,544,143 | 8/1996 | Kay et al. | 369/112 X |
| 5,546,371 | 8/1996 | Miyazaki | 369/112 |
| 5,581,523 | 12/1996 | Seki et al. | 369/112 X |

FOREIGN PATENT DOCUMENTS

| | | |
|---|---|---|
| A-0 202 689 | 11/1986 | European Pat. Off. . |
| A-0 360 209 | 3/1990 | European Pat. Off. . |
| A-0 467 303 | 1/1992 | European Pat. Off. . |
| A-0 614 098 | 9/1994 | European Pat. Off. . |

*Primary Examiner*—Paul W. Huber
*Attorney, Agent, or Firm*—Hill & Simpson

[57] ABSTRACT

An optical apparatus that lends itself to size reduction and mass production and enables detection of a return light beam by a pre-set operation irrespective of the state of the return light. The optical apparatus has a reflecting mirror 11 arranged in the vicinity of the focal point of the return light beam obtained on reflection by an illuminated object of the outgoing light from a laser light source 3, such as a semiconductor laser, and photodiodes $PD_{1A}$, $PD_{2A}$, $PD_{3A}$, $PD_{1B}$, $PD_{2B}$ and $PD_{3B}$, as light receiving portions, arranged facing first and second reflecting surfaces $M_A$ and $M_B$ of the reflecting mirror 11. The reflecting surfaces $M_A$ and $M_B$ are arranged for reflecting a portion of the return light, while signal detection is performed by the light receiving portions.

6 Claims, 22 Drawing Sheets

5,793,732

1

OPTICAL APPARATUS HAVING REFLECTING PORTON SPLIT BY AN EDGE

BACKGROUND OF THE INVENTION

1. Field of the Invention

This invention relates to an optical apparatus for detecting a signal by receiving a light beam radiated from a light radiating portion and reflected back from an illuminated body, and a recording and/or reproducing apparatus preferably employed with the optical apparatus.

2. Related Art

The optical pickup of an optical disc drive or a magneto-optical disc drive, for a conventional optical apparatus, such as a compact-disc (CD) player, is bulky in size since optical components, such as a grating or a beam splitter, are assembled separately. In addition, the production process cannot be simplified because of the complex structure of the optical arraying or setting.

Referring to the enlarged diagrammatic view of FIG. 37, a light beam radiated from a light source 51, such as a semiconductor laser diode, is introduced into and transmitted through a grating 52 so as to be condensed via a collimator lens 54 on a recording area on the surface of an optical recording medium 56, such as an optical disc, by an objective lens 55. In FIG. 37, A chain-dotted line c denotes an optical axis extending from the light source 51 to the optical recording medium 56.

The light beam reflected from the optical medium 56 is reflected by a beam splitter 54 via an objective lens 55 and a collimator lens 54 so as to depart from the optical axis c. The light beam then is condensed and detected by a detector 59, such as a photodiode (PD), via a concave lens 57 and a cylindrical lens 58 provide sideways of the optical axis c.

As an alternative optical apparatus, that is an optical pickup of a reflection type light scanning microscope shown in FIG. 38, a light beam radiated from a light source 51 and reflected by a beam splitter 53, is condensed by an objective lens 55 so as to be radiated on the surface of a sample 60. A broken line 61 denotes a focal plane. The light beam reflected by the sample 60 is transmitted via the objective lens 55 through the beam splitter 53 and thence transmitted to a detector arranged at a confocal point for detection through a pinhole 62 arranged at a confocal point so as to be detected by a detector 59 arranged at back of the pinhole 62. The status of the sample surface may be detected by relatively scanning a stage carrying the sample 60 thereon or an illuminating beam as indicated by arrow s for detecting the state of the sample surface.

Thus, with the conventional pickup type apparatus, since the reflected light beam is necessarily returned to the radiating position, a beam splitter or a hologram is arranged between a laser light beam from the light source and an illuminated object for separating the incident light and the return light from each other. Thus the light volume received by the light receiving element is diminished (see for example JP Patent Kokai Publications JP-A-Hei-2-278779 or 1-303638)

If the above-mentioned optical pickup device and so forth are to be assembled in a hybridized manner on one semiconductor substrate, such as Si substrate, strict precision in alignment is demanded (see for example JP Patent Kokai Publication JP-A-Hei-2-278779).

Meanwhile, the present Assignee has proposed in U.S. patent application Ser. No. 294307 an optical apparatus for increasing the light volume received by the light receiving element.

2

The optical device has at least a light radiating portion and a light receiving portion proximate to the light radiating portion and the light directly returned from the light radiating is incident on the light receiving portion.

With the optical apparatus, in which numerical aperture of the lens NA and the wavelength of the outgoing light are 0.09 and 780 nm, respectively, the refraction threshold of the direct return light from the light radiating portion as defined by 1.22 $\lambda$/NA becomes as large as approximately 10 μm, thus enabling signal detection.

With the above optical apparatus, since there is no necessity of separating the return light by the beam splitter, it becomes possible to decrease the number of components parts to simplify the assembly and reduce the size of the apparatus, while it also becomes possible to increase the volume of the return light to improve the detection efficient and reduce power consumption.

Meanwhile, the optical components employed for the optical apparatus may adapt themselves to size reduction and mass production. For producing focusing error signals or tracking error signals, it is desirable to employ optical components capable of detecting the return light with a constant operation irrespective of the state of rotation of the disc-shaped recording medium. For detecting photomagnetic signals accompanied by polarized modulated components, it is desirable to employ an optical component capable of return light beam detection after separation of the polarized light.

OBJECT AND SUMMARY OF THE INVENTION

It is therefore an object of the present invention to provide an optical apparatus which lends itself to reduction in size and mass production and which is able to detect the return light with a pre-set operation.

In one aspect, the present invention provides an optical apparatus including a reflecting portion arranged in the vicinity of a focal point of a light beam from an illuminated object, and a light receiving portion arranged facing a reflecting surface of the reflecting portion. The reflecting surface is arranged for reflecting a portion of the light beam from the illuminated object and the reflecting surface is adapted for detecting signals.

The light receiving portion has at least two light receiving elements, and detects focusing error signals, using the reflecting portion for the return light beam as a knife edge.

The light receiving portion has at least two light receiving elements and at least one of the light receiving elements is a light receiving element for detecting polarized light components separated from the light beam from the illuminated object.

In another aspect, the present invention provides an optical apparatus including a light radiating portion, a reflecting portion having at least an outgoing light reflecting surface for reflecting an outgoing light from the light radiating portion and a light receiving reflecting surface and at least one light receiving portion. The reflecting portion is arranged in the vicinity of an image point of the return light beam which is the illuminating light beam from the light radiating portion reflected by an illuminated object. The light radiating portion is arranged facing the outgoing light reflecting surface and the light receiving portion is arranged facing the light receiving reflecting surface.

The light receiving portion has at least two light receiving elements and at least one of the light receiving elements is a light receiving element for detecting polarized light components separated from the light beam from the illuminated object.

In yet another aspect, the present invention provides a reproducing apparatus for an optical recording medium for detecting a return light beam obtained after illumination of an optical recording medium. The recording apparatus includes a light radiating portion for radiating a light beam to be illuminated on the optical recording medium, light condensing means for condensing the light beam outgoing from the light radiating portion on the optical recording medium, an optical apparatus and a reproducing portion for reproducing the contents of the optical recording medium based on signals detected by said optical apparatus. The optical apparatus has a return light reflecting portion and a light receiving portion arranged in the vicinity of an imaging point of the return light for facing the reflecting surface of the return light beam reflecting portion. The reflecting surface is arranged for reflecting a portion of the return light. The light receiving portion operates for detecting various control signals.

With the optical apparatus of the present invention, the return light obtained by illuminating a recording medium with a laser light beam is reflected by a reflecting surface provided on the surface of a reflecting portion. The return light beam is detected by light receiving portions, such as photodiodes.

By employing the reflecting portions as a knife edge, a focusing error signal is produced as signals.

If one of plural light receiving elements of the light receiving portion is designed for detecting polarized light components separated from the light beam, photomagnetic signals may be detected for decoding a polarized modulated light component on a magneto-optical disc.

If the light receiving portion is made up of a plurality of, for example, two, light receiving elements, a tracking error signal, for example, may be produced from the return light detected by the first and second light receiving parts of the light receiving portion.

With the reproducing apparatus for reproducing an optical recording medium of the present invention, the laser light beam radiated from the light radiating portion is transmitted through light condensing means so as to be condensed on the optical recording medium. The return light corresponding to the laser light beam reflected from the reflecting surface of the optical element is detected by a light receiving element provided facing the reflecting surface of the optical element. The contents of the optical recording medium are reproduced by the reproducing unit based upon the results of detection.

With the optical apparatus according to the present invention, as described above, since there is no necessity of providing an external light receiving portion for detecting signals obtained on reading the contents of the optical recording medium, adjustment operations may be eliminated, while the optical apparatus may be reduced in size. In addition, since the apparatus may be produced by a simplified process, the apparatus may be mass-produced with low production cost.

If the reflecting portion is used as a knife edge, the optical apparatus designed for detecting focusing error signals by the knife edge method may be reduced in size. In addition, since the apparatus may be produced by a simplified process, the optical apparatus may be mass-produced with low production cost.

If at least one of the light receiving parts is designed for separating the laser light beam into polarized light components, the optical apparatus designed for detecting photomagnetic signals accompanied by polarized light components may be reduced in size.

In addition, if the light receiving portion is made up of at least two light receiving parts, and the focusing error signals are detected by exploiting the light in the vicinity of the focal point, detection errors due to, for example, lens offset, may be diminished. In addition, since the optical apparatus may be produced by a simplified process, the optical apparatus may be mass-produced with low production cost.

Furthermore, with the reproducing apparatus for an optical recording medium according to the present invention, since there is no necessity of providing a light receiving portion outside the optical apparatus for detecting various signals during reading of the contents of the optical recording medium by the optical apparatus, no adjustment operations are required, while the optical apparatus may be reduced in size. Besides, since the optical apparatus may be produced by a simplified process, the optical apparatus and hence the reproducing apparatus for an optical recording medium may be mass-produced with low production cost.

EMBODIMENTS

Figure 1:
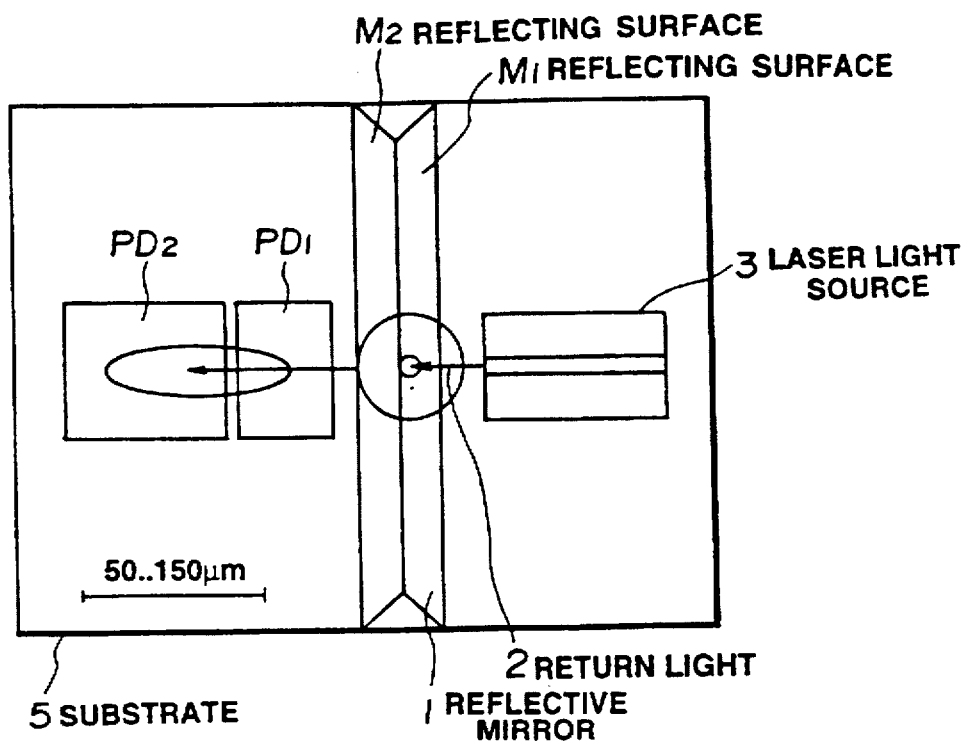
FIG. 1 is a plan view showing an optical apparatus according to a first embodiment of an optical component of the present invention.

Referring to the drawings, an optical apparatus, as applied to an optical pickup, is explained in detail.

Figure 2:
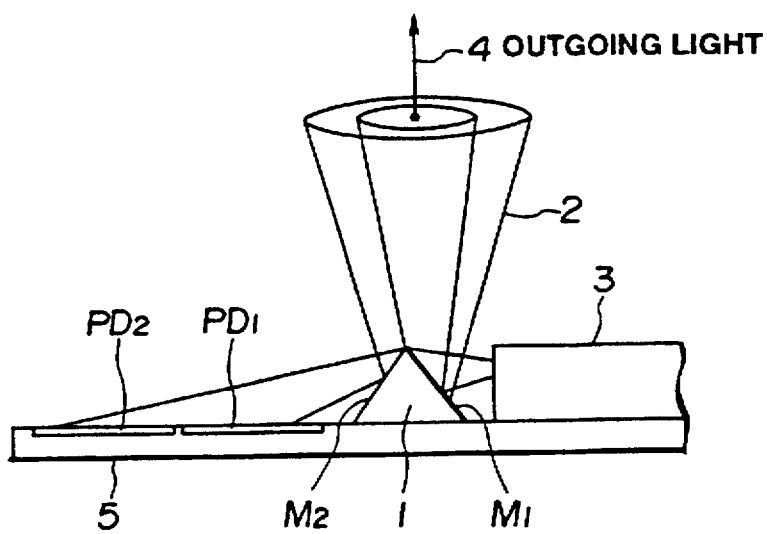
FIG. 2 is a side view of the optical apparatus shown in FIG. 2.

FIGS. 1 and 2 schematically show essential portions of the optical apparatus by a top view and a side view, respectively.

Referring to FIGS. 1 and 2, the optical apparatus includes a reflection mirror 1 as a reflecting portion arranged in the vicinity of a focal point of the return light produced on reflection by an illuminated member of a light beam radiated form a laser light source 3, such as a semiconductor laser, and photodiodes $PD_1$, $PD_2$ as a light receiving portion arranged facing a light reflecting surface $M_2$ of the reflecting portion. The reflecting surface $M_2$ is arranged for reflecting part of the return light and is configured for detecting a signal at the light receiving portion.

In the optical apparatus, shown in FIGS. 1 and 2, a substrate 5 is formed of, for example, gallium-arsenic (GaAs). The laser light source 3 is secured to the substrate 5 and radiates a semiconductor laser light beam of aluminum-gallium-arsenic (AlGaAs). The reflective mirror 1 is in the form of a triangular pyramid formed of, for example, a GaAs crystal, laid horizontally, with one of lateral sides of the pyramid coinciding with the surface of the substrate 5 and with the other two sides serving as a radiating light reflecting surface $M_1$ and an incoming light reflecting surface $M_2$ (light receiving reflecting surface). The outgoing light reflecting surface $M_1$ faces the laser light radiating direction of the laser light source 3. A pair of light receiving elements, made p of photodiodes $PD_1$ and $PD_2$, are provided on the substrate 5 for facing the reflecting surface $M_2$.

The substrate 5 is inclined approximately 9° from the crystal plane (100) in a <011> direction. In FIG. 2, if the outgoing light reflecting surface $M_1$ and the reflecting surface for incoming light $M_2$ are is formed by the crystal plane (111), the outgoing light reflecting surface $M_1$ is provided at an angle of approximately 45° with respect to the substrate 5, whereby the outgoing light from the laser light source 3 is reflected by the outgoing light reflecting surface $M_1$ in a direction substantially at right angles to the substrate 5.

For fabricating the optical apparatus, respective layers of the semiconductor laser, that is a first clad layer, an active layer and a second clad layer, are formed by epitaxial crystal growth from an AlGaAs semiconductor material on the above-mentioned n-GaAs substrate inclined by approximately 9° from the crystal surface (100) in the <100> direction. For this epitaxial growth, the MOCVD method, as one of the crystal growth methods, is employed. This MOCVD method is a crystal growth method which may be carried out relatively easily. After growth of the crystal, a pattern formed by an insulating film is photolithographically formed on a portion where the semiconductor laser is to be formed. Using this insulating film as a mask, anisotropic etching by RIE, one of the etching methods, is carried out for forming an end face of a resonator of the semiconductor laser. A reflecting portion of, for example, GaAs, which is to be the reflective mirror 1, is selectively formed facing one of the resonator end faces of the semiconductor laser on the substrate by the MOCVD method. The outgoing light reflecting surface $M_1$ and the reflecting surface for incoming light $M_2$ are automatically formed only by the growth process due to the difference in the rates of growth of crystal planes. Facing the reflective surface for incoming light $M_2$ is then formed a pn junction by ion implantation or crystal growth. In this manner, the photodiodes $PD_1$ and $PD_2$ are formed separately. Then, optical components, such as lenses, are formed for completing the optical apparatus.

With the optical apparatus, shown in FIGS. 1 and 2, the laser light radiated from the laser light source 3 is reflected by the reflecting surface $M_1$ of the reflecting surface 1 in a direction substantially at right angles to the substrate 5. The reflected laser light beam is condensed by light condensing means, such as a lens, not shown, so as to form a focal point near an illuminated member, such as an optical disc, not shown.

The return light, reflected by the illuminated member, is re-condensed by the light condensing means so as to be received by the photodiodes $PD_1$, $PD_2$ as the light receiving portions. The light receiving portions are split in two, such that focusing error signals may be detected by comparing the photoelectric current $I_1$ at the photodiode $PD_1$ to the photoelectric current $I_2$ at the photodiode $PD_2$ in accordance with a knife edge method as now explained. The light intensities $I_1$, $I_2$ are compared to each other by detecting the difference or the ratio of the two photoelectric current intensities.

Before proceeding to explanation of the operation of the optical elements, the principle of detection of the focusing error signals by the knife edge method is explained.

Figures 3A, 3B:
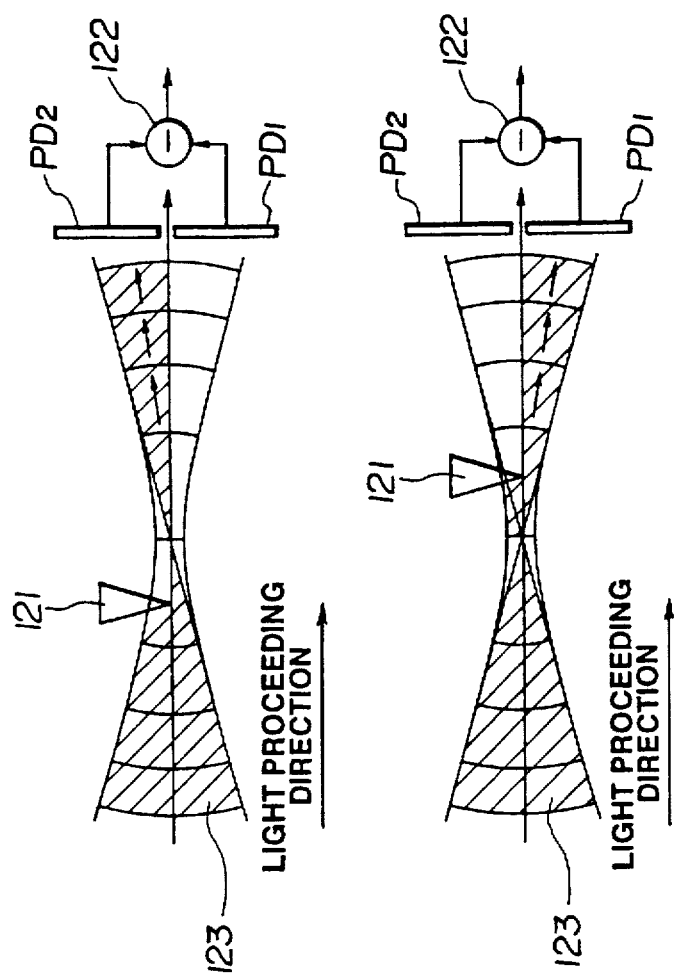
FIGS. 3A and 3B illustrate the principle of detecting focusing error signal by a knife edge method.

FIGS. 3A and 3B illustrate the knife edge method.

Referring to FIGS. 3A and 3b, the knife edge method is such a method in which a knife edge 121 is set on the converging light path before the return light 123 reaches the photodiodes $PD_1$ and $PD_2$ and the intensities of the photoelectric currents detected by the photodiodes $PD_1$ and $PD_2$ are compared to each other by a comparator 122 for producing a focusing error signal.

In the above-described first embodiment, the light component reflected by the outgoing light reflecting surface $M_1$ corresponds to a shielded light component in FIG. 3, while the light component reflected by the reflecting surface for incoming light $M_2$ corresponds to a light component reaching the light receiving portion via the knife edge. Thus the reflective mirror 1 operates as the above-mentioned knife edge.

Figures 4A, 4B:
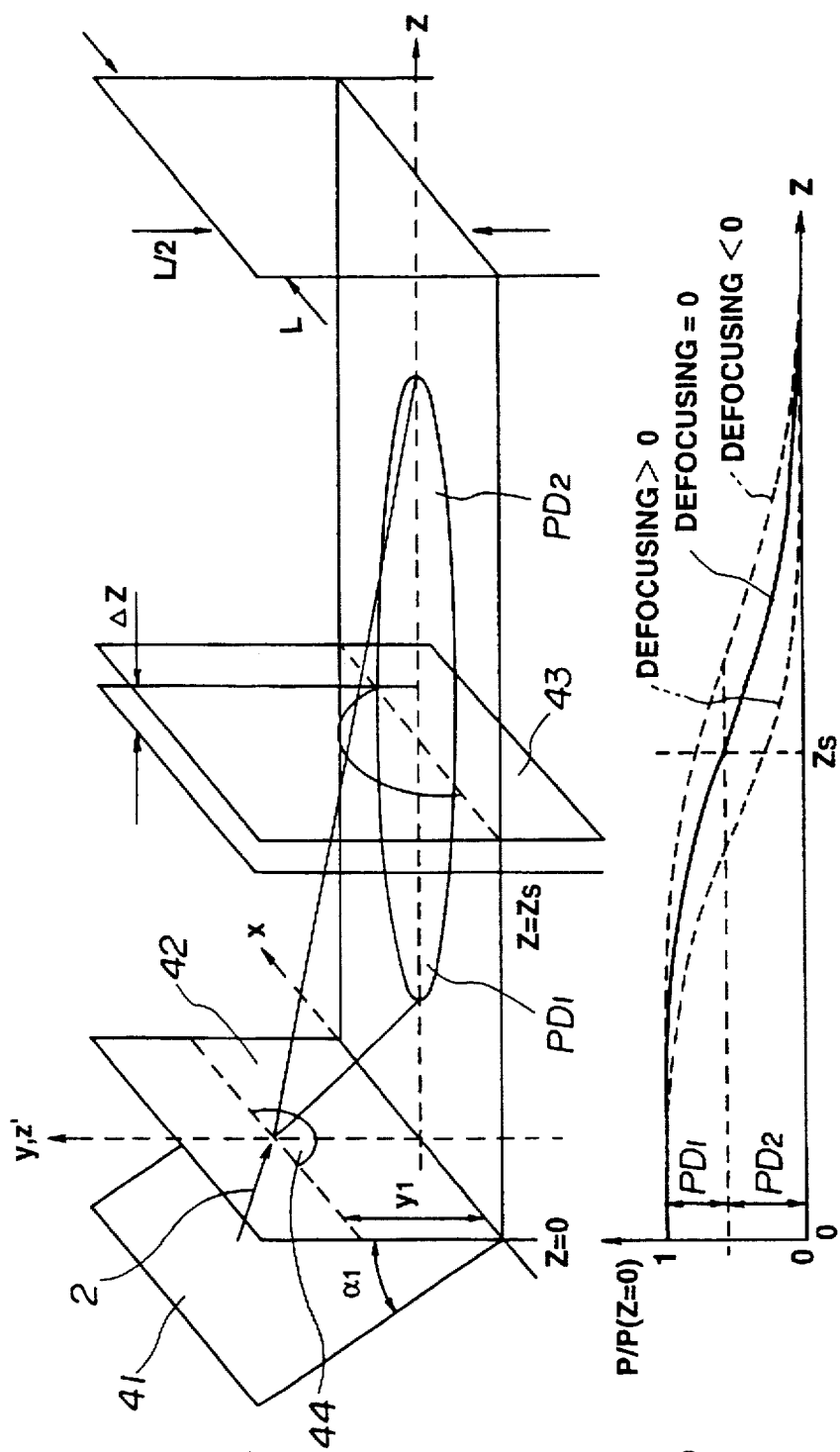
FIGS. 4A and 4B illustrate a modelled knife edge method.
Figure 5A:
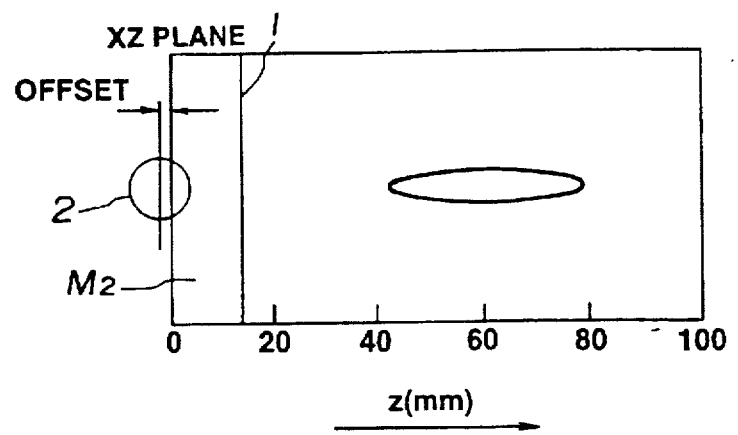
FIGS. 5A to 5D are graphs showing calculated results of propagated return light on an XZ plane in the optical apparatus of the first embodiment.
Figure 5B:
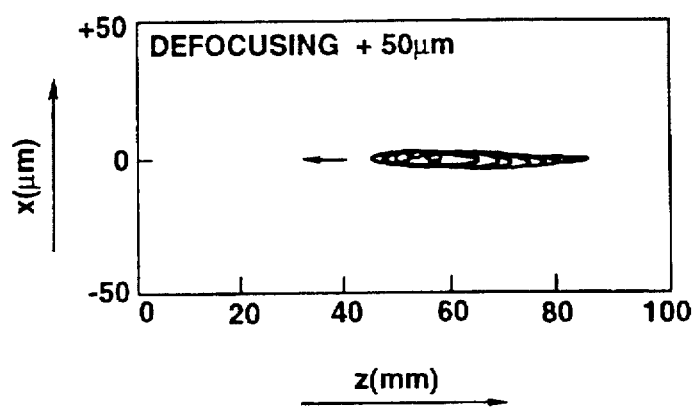
Figure 5C:
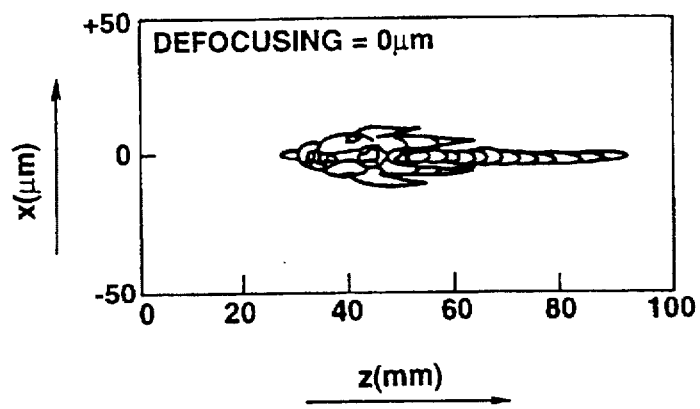
Figure 5D:
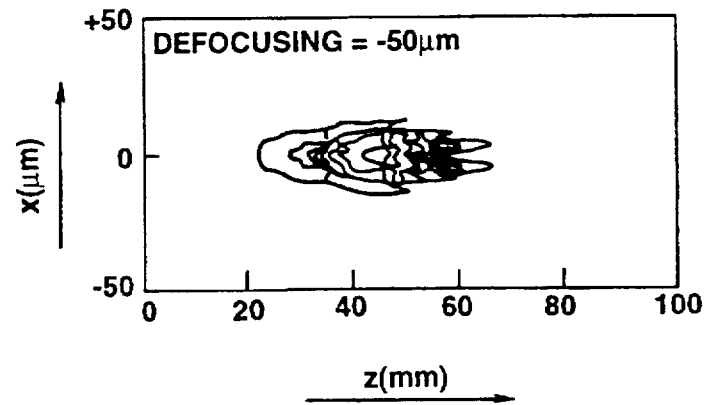
Figure 6A:
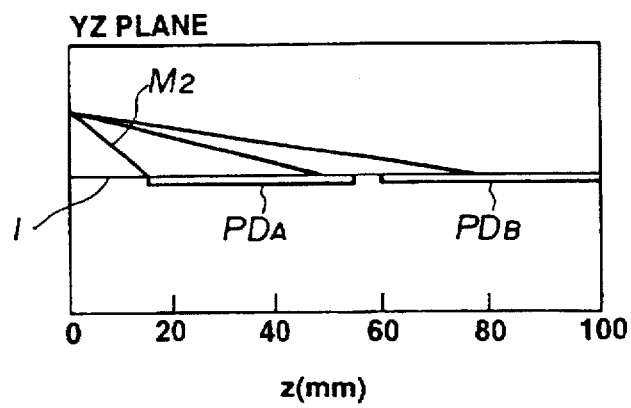
FIGS. 6A to 6D are graphs showing calculated results of propagated return light on a YZ plane in the optical apparatus of the first embodiment.
Figure 6B:
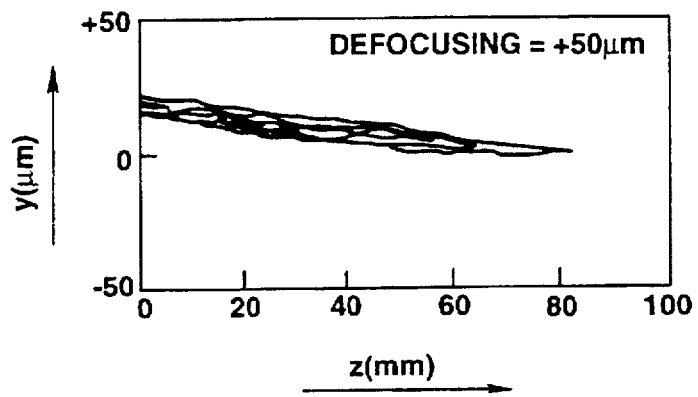
Figure 6C:
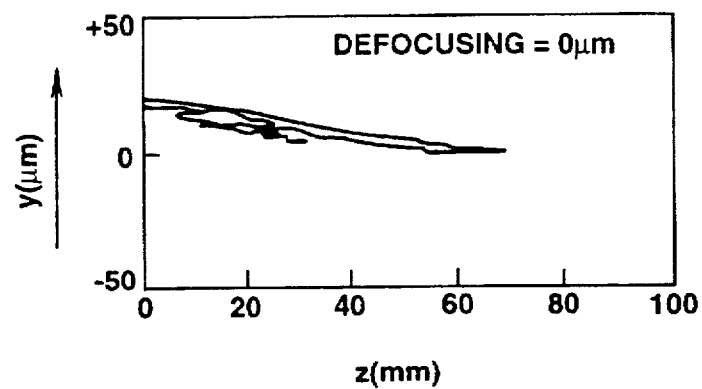
Figure 6D:
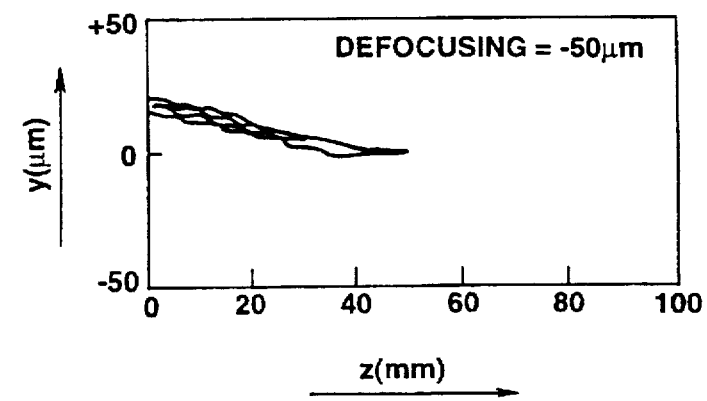

FIG. 4A illustrates a knife edge method modelled in accordance with the first embodiment. FIG. 4B shows changes the light energy remaining after light absorption by an absorber 43 as later explained in a direction along the optical axis, that is along the z-axis. That is, in FIG. 4A, a portion below the XZ plane is assumed to be the absorber 43 configured for absorbing the light. The surface of the absorber 43 corresponds to the surface of the light receiving portion. The position in which the light reflecting surface meets the light receiving surface is the position Z=0. The positions specified by $Z<Z_S$ and $Z>Z_S+\Delta Z$ are the positions in which the photodiodes $PD_1$ and $PD_2$ are assumed to be set. In FIG. 4B, a solid line shows the disposition for defocusing equal to zero, while broken lines show the disposition for defocusing not equal to zero.

FIGS. 4A and 4B simulate an arrangement in which the light incident on the reflective mirror 1 of the first embodiment is partially reflected to fall on the photodiodes and an arrangement in which the light totally reflected by a mirror 41 is partially interrupted by a mask 42 having a pre-set shape.

The return laser light beam from the illuminated member, such as a recording medium, is reflected by the mirror 41, and is passed through a mask 42 interrupted at an area 44 of the XY-plane at Z=0 as shown in FIG. 4A. The light beam passing through the mirror becomes a light equivalent to the light reflected by the reflective mirror 1 of the first embodiment, that is the light via the knife edge. The light beam then falls at a position on the absorber 43 as the light receiving portion in which the photodiodes $PD_1$ and $PD_2$ are assumed to be set. FIG. 4B shows the relation between the light energy P remaining after absorption by the absorber 43 and the distance Z, in which the value of P is normalized by the value of P for Z=0.

It is also seen from FIG. 4B that the distribution of light absorbed by the absorber 43 corresponds to the distribution of energy detected within a range of positions where the photodiodes $PD_1$ and $PD_2$ are assumed to be set.

If the photodiodes $PD_1$ and $PD_2$ are set, and the intensities of the photoelectric currents $I_1$, $I_2$ are assumed to be detected by these photodiodes, the distribution of the light energy P becomes equal to the distribution of the intensities $I_1$, $I_2$. That is, the values $I_1$ and $I_2$ become smaller and larger, respectively, for a range of a larger value of defocusing, while the values $I_1$ and $I_2$ become larger and smaller, respectively, for a range of a larger value of defocusing. Thus the focusing error signals can be detected by comparing the values of the intensities $I_1$, $I_2$ as detected by the photodiodes $PD_1$ and $PD_2$.

For estimating the light volume received by the photodiodes $PD_1$ and $PD_2$ in the application of the above-described knife edge method, the results of calculations of beam propagation for the defocusing of the return light in the optical apparatus are shown in FIGS. 5 and 6. In FIGS. 5 and 6, in which an offset of the reflecting surface for incoming light $M_2$ from the center of the return light is set to 2 µm, the results of calculations for the XZ plane and the YZ plane are shown, respectively.

It is seen from FIGS. 5 and 6 that the larger the defocusing, the further is the incident position of the return light beam 2 separated away from the reflecting surface $M_2$.

Figure 7:
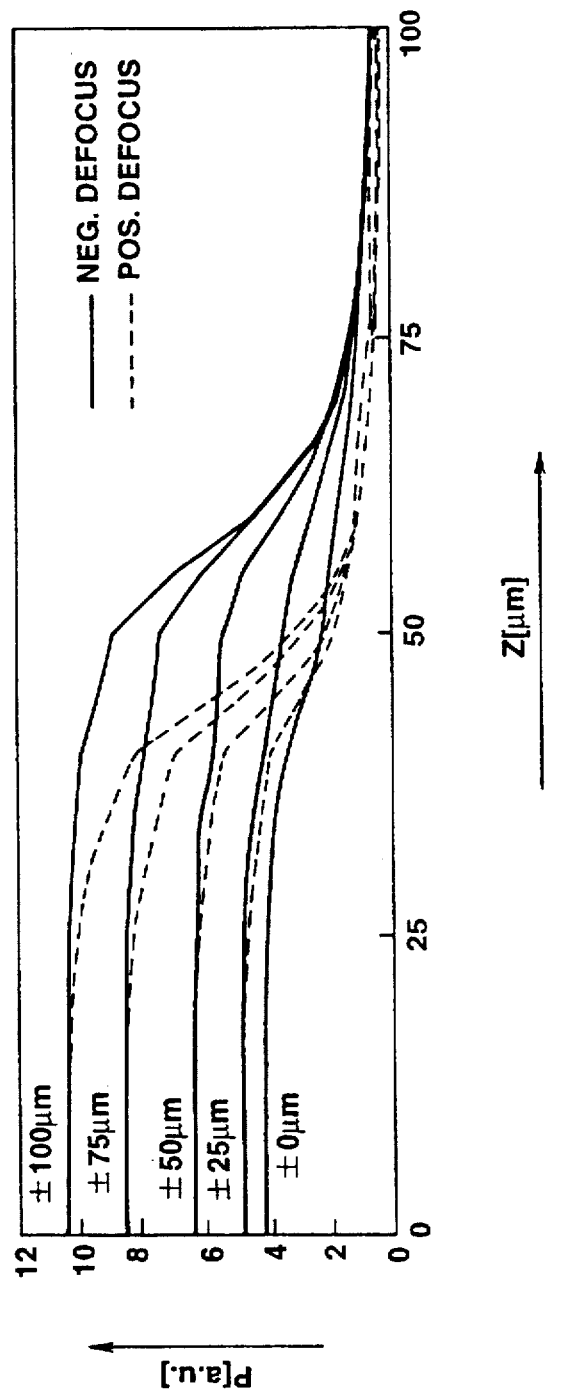
FIG. 7 is a graph showing the relation between the light intensity and a distance from a position of contact between a reflecting surface and a light receiving surface in the optical apparatus of the first embodiment, for different defocusing amounts.
Figure 8:
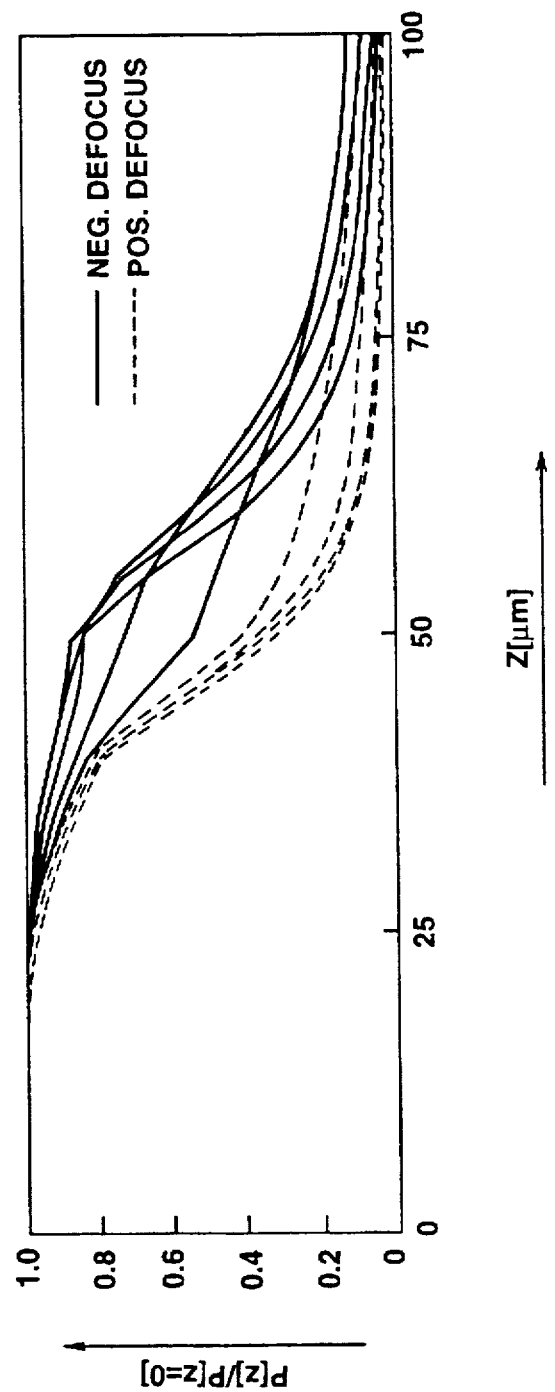
FIG. 8 is a graph showing the normalized relation between the light intensity and a distance from a position of contact between a reflecting surface and a light receiving surface in the optical apparatus of the first embodiment, for different defocusing amounts.

FIG. 7 shows the relation between the light intensity P[a.u.] and the distance Z [µm] from the position of contact between the light receiving reflecting surface $M_2$ and the plane of the photodiodes $PD_1$ and $PD_2$ for different values of defocusing. FIG. 8 shows the relation between the distance Z and the above value P[z] for each defocusing value normalized on the basis of the value of P for Z=0 (P[z=0]). In FIGS. 7 and 8, solid-line curves and broken-line curves stand for those for negative defocusing values and for positive defocusing values, respectively. Also, the larger the magnitude of the absolute value of defocusing, the larger becomes the value of P [Z=0].

Figure 9:
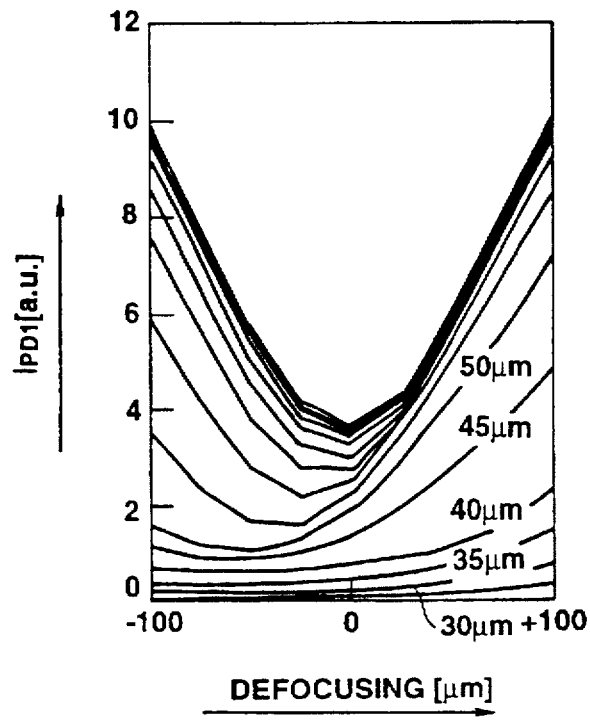
FIG. 9 is a graph showing the relation between defocusing and light intensity detected by a photodiode in the optical apparatus of the first embodiment.
Figure 10:
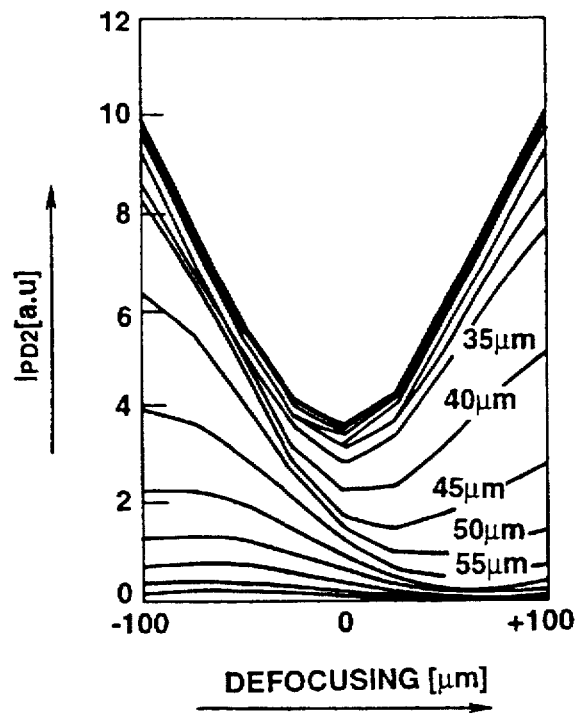
FIG. 10 is a graph showing the relation between defocusing and light intensity detected by the other photodiode in the optical apparatus of the first embodiment.

FIG. 9 shows the relation between the defocusing value (µm) for the value of Z in a range specifying the boundary between the photodiodes $PD_1$ and $PD_2$ and the intensity of the light $I_{PD1}$ reaching the photodiode $PD_1$ ($I_{PD1}$[a.u.]). FIG. 10 shows the relation between the defocusing value and the intensity of the light $I_{PD2}$ reaching the photodiode $PD_2$. The height of the reflective mirror, the inclination of the reflective surface towards the XZ plane, the mesh size of the calculation grid, the beam propagation step in the Z-direction $\Delta Z$ and an offset of the knife edge from the beam center were set to 20 µm, 54.7°, 780 nm, 5 µm and 2 µmm, respectively. The results obtained by calculating the initial electrical field at Z=0 by the Bessel function were employed.

Figure 11:
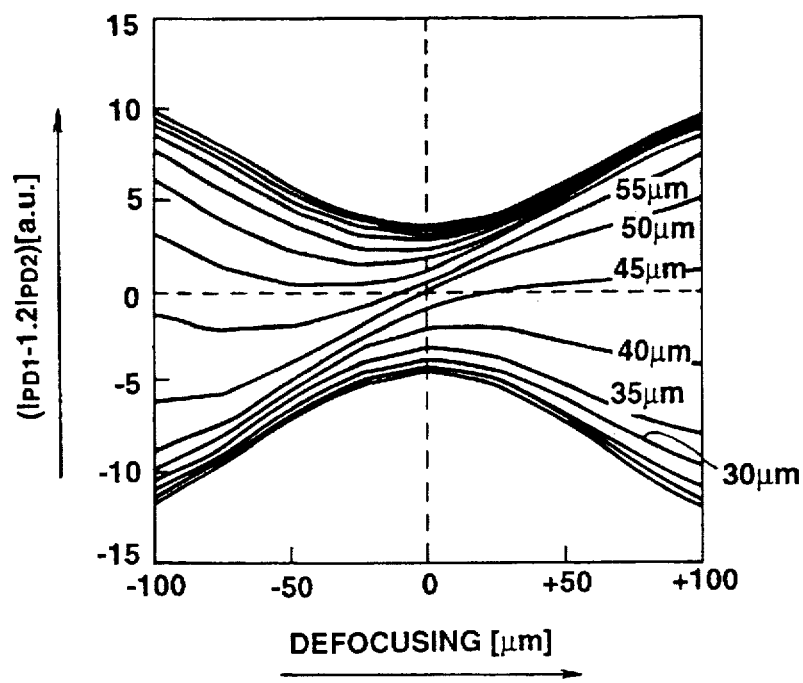
FIG. 11 is a graph showing the results of comparison of the light intensity detected by one photodiode and that detected by the other photodiode in the optical apparatus of the first embodiment.
Figure 12:
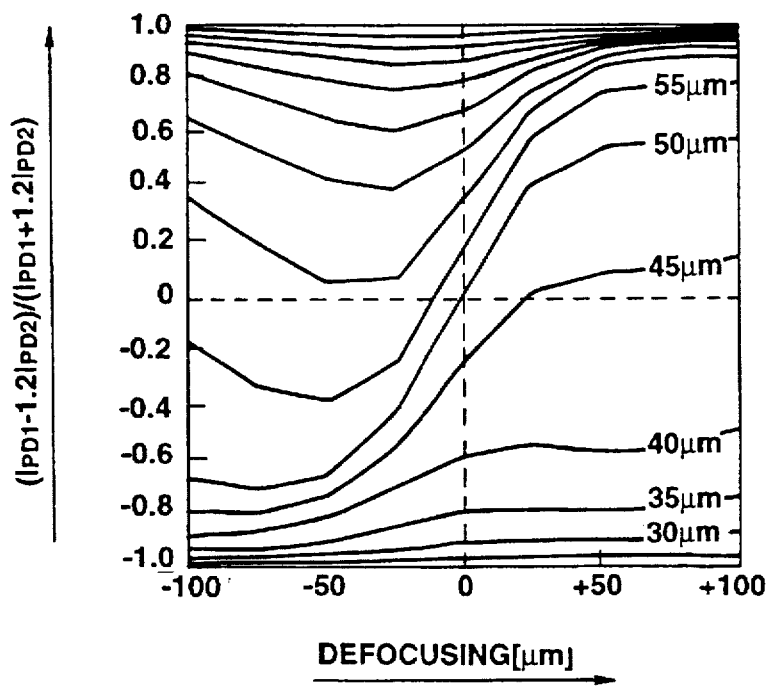
FIG. 12 is a graph showing the normalized results of comparison of the light intensity detected by one photodiode and that detected by the other photodiode in the optical apparatus of the first embodiment.

By way of comparison of the values of $I_{PD1}$ and $I_{PD2}$, the relation between the values of $(I_{PD1}-1.2*I_{PD2})$ [a.u.] and the values of defocusing [µm] for each value of Z is shown in FIG. 11. The relation between the defocusing value (µm) and the values of $(I_{PD1}-1.2*I_{PD2})$ for various values of Z normalized with $(I_{PD1}+1.2*I_{PD2})$ is shown in FIG. 12. The weight 1.2, by which $I_{PD2}$ is multiplied, is such a value for which the difference between $I_{PD1}$ and $I_{PD2}$ for Z equal to 50 µm and defocusing equal to 0 becomes equal to zero.

Referring to FIGS. 6 to 12, the focusing error signal becomes detectable when the boundary between the photodiodes $PD_1$ and $PD_2$ is positioned in a range of 25 µm<Z<75 µm, preferably 40 µm<Z<55 µm.

Figure 13:
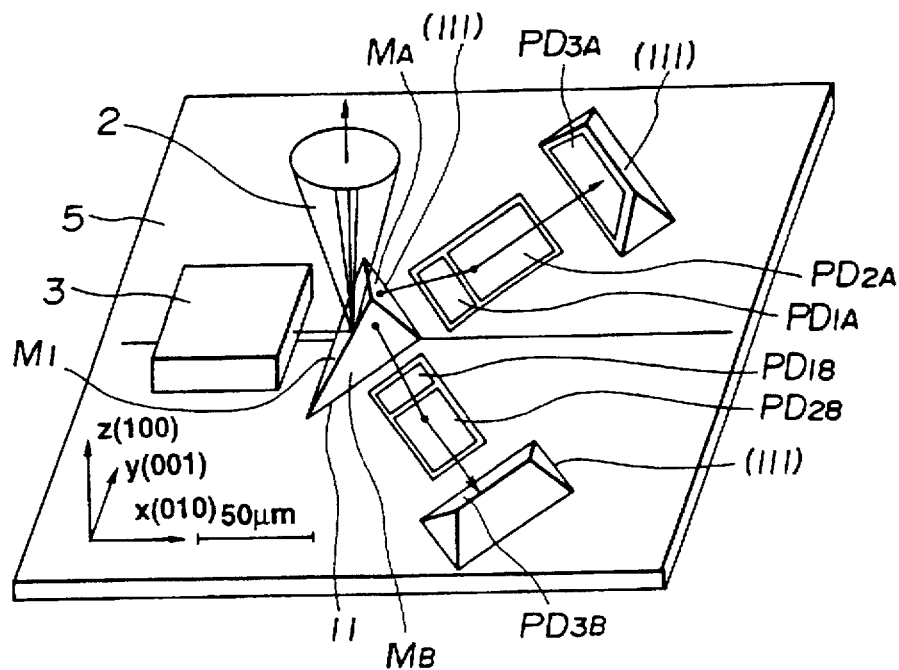
FIG. 13 is a perspective view showing an optical apparatus employing an optical element according to a second embodiment of the present invention.
Figure 14:
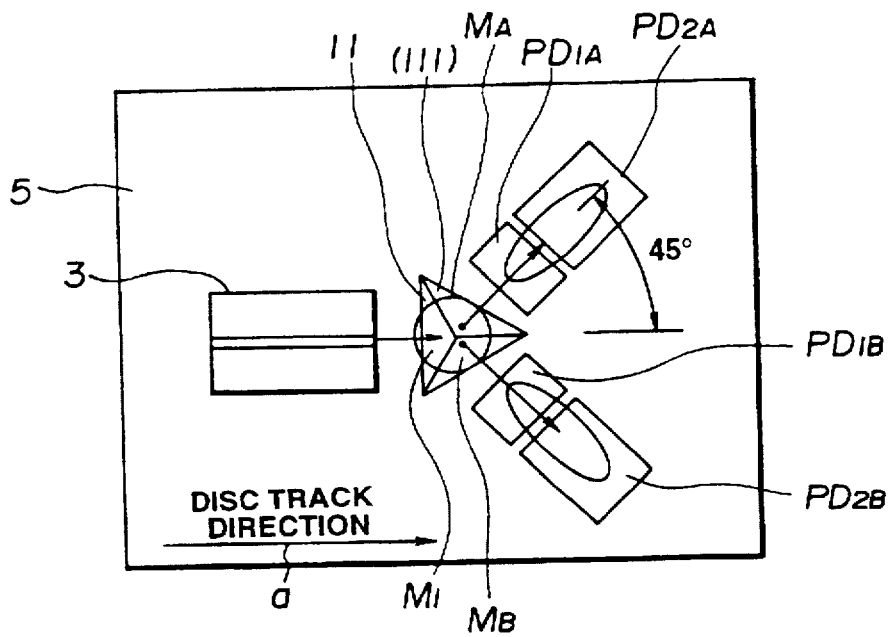
FIG. 14 is a schematic plan view of an optical apparatus of the second embodiment.

In FIGS. 13 and 14, the essential portions of the optical apparatus according to a second embodiment of the present invention and the same apparatus devoid of the photodiodes $PD_{3A}$ and $PD_{3B}$ are shown, respectively.

The optical apparatus of the present second embodiment includes a reflecting mirror 11, arranged as a reflecting portion in the vicinity of the focal point of the return light obtained on reflection of the outgoing light from the laser light source 3 as a light emitting portion, and photodiodes $PD_{1A}$, $PD_{2A}$, $PD_{3A}$, $PD_{1B}$, $PD_{2B}$, $PD_{3B}$, as light receiving portions arranged facing the first and second reflecting surfaces $M_A$ and $M_B$ of the reflecting portion, as shown in FIGS. 13 and 14.

In the above-described optical apparatus of the second embodiment, the outgoing light reflecting surface $M_1$, as a reflecting portion of a triangular pyramid, and the first and second reflecting surfaces $M_A$ and $M_B$, are arranged on a substrate 5 of, for example, GaAs, having the crystal plane (100) as a major surface. The outgoing light reflecting surface $M_1$ is formed of, for example, GaAs and has crystal planes (1-10), (111) and (11-1). The laser light source 3 is provided facing the first reflecting surface $M_1$, while the photodiodes $PD_{1A}$, $PD_{2A}$ and $PD_{3A}$ are arranged in this order on the substrate 5 for facing the first light reflecting surface $M_A$ along the return light path beginning from the first reflecting surface $M_A$, and the photodiodes $PD_{1B}$, $PD_{2B}$ and $PD_{3B}$ are arranged in this order on the substrate 5 for facing the second reflecting surface $M_B$ along the return light path beginning from the second reflecting surface $M_B$. The photodiodes $PD_{1A}$, $PD_{2A}$ and $PD_{1B}$, $PD_{2B}$ are split in directions at right angles to the optical axis of the light path, while the photodiodes $PD_{3A}$, $PD_{3B}$ are provided on the crystal planes (1-1-1) and (1-11) of the portion of the substrate where GaAs, for example, has been formed by crystal growth. If the first and second reflecting surfaces $M_A$, $M_B$ are formed by crystal planes (111) and (11-1), the optical axis of the return light 2 is separated by the reflective mirror 11 into two beams extending at right angles to each other.

On the surfaces of the $PD_{1A}$, $PD_{2A}$, $PD_{1B}$ and $PD_{2B}$ are formed metal grids or coating films for selectively reflecting the S-polarized light component of the laser light beam and for transmitting the P-polarized light component of the laser light beam. On the surfaces of the photodiodes $PD_{3A}$ and $PD_{3B}$ are formed metal grids or coating films for selectively reflecting the P-polarized component of the laser light beam and for transmitting its S-polarized component.

The method for producing an optical apparatus of the second embodiment, which is similar to the method for producing the optical apparatus of the first embodiment, is now explained by referring to FIGS. 15 to 25.

Figure 15:
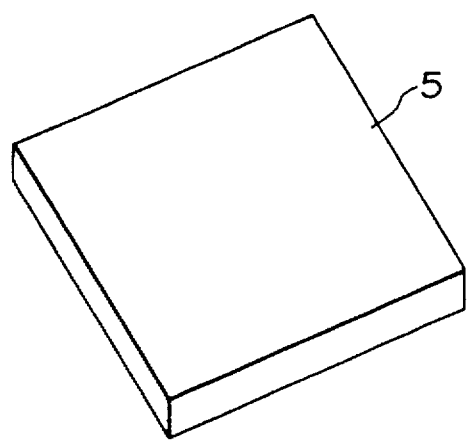
FIGS. 15 to 25 illustrate the production process for an optical apparatus of the second embodiment.
Figure 16:
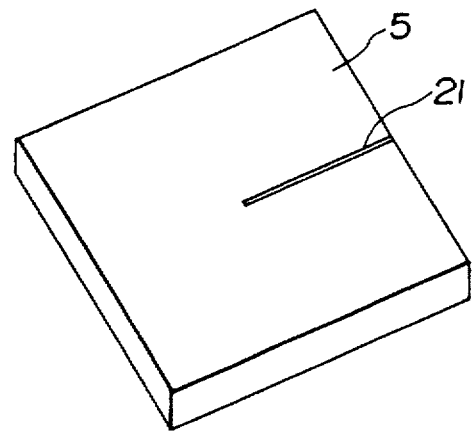
Figure 17:
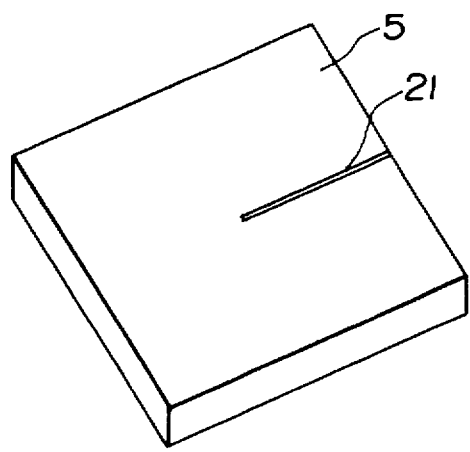
Figure 18:
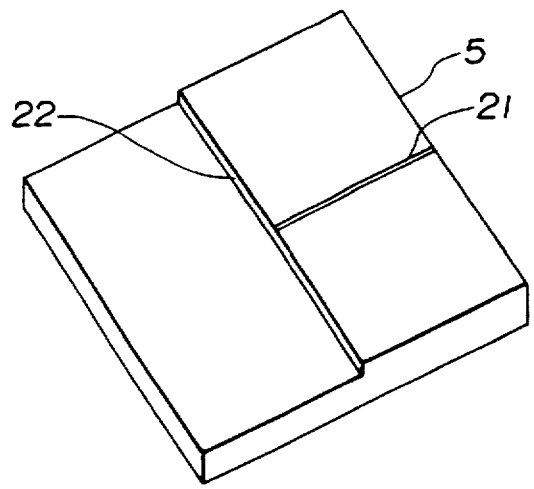
Figure 19:
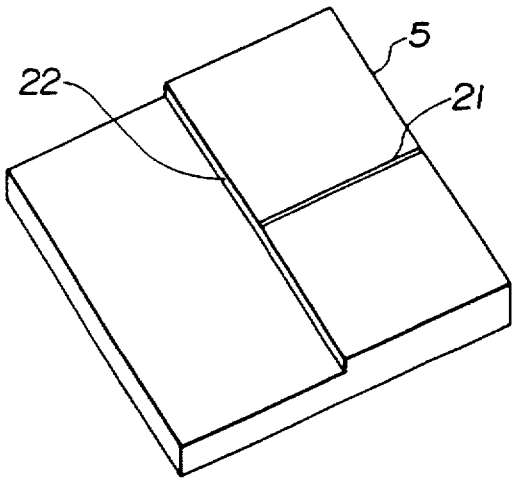
Figure 20:
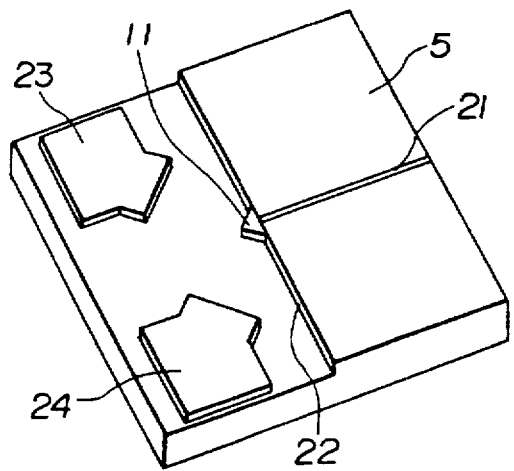
Figure 21:
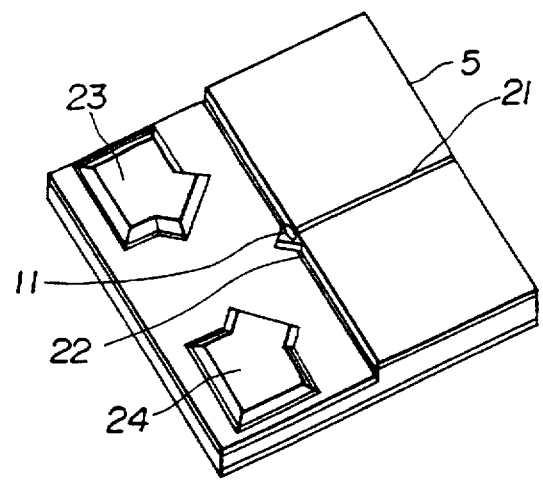
Figure 22:
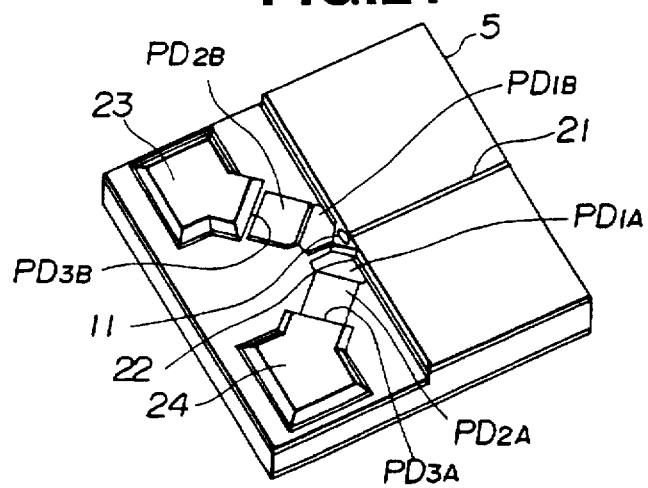
Figure 23:
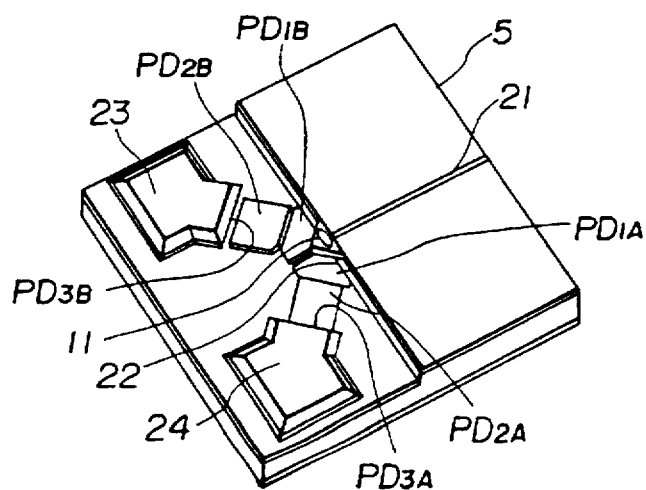
Figure 24:
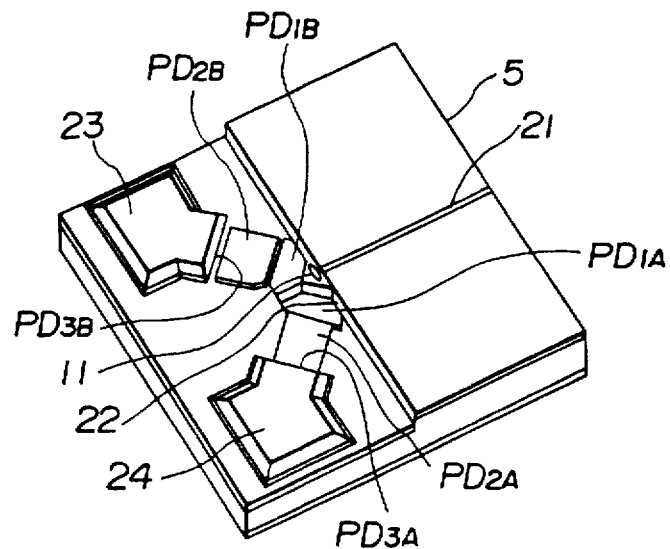
Figure 25:
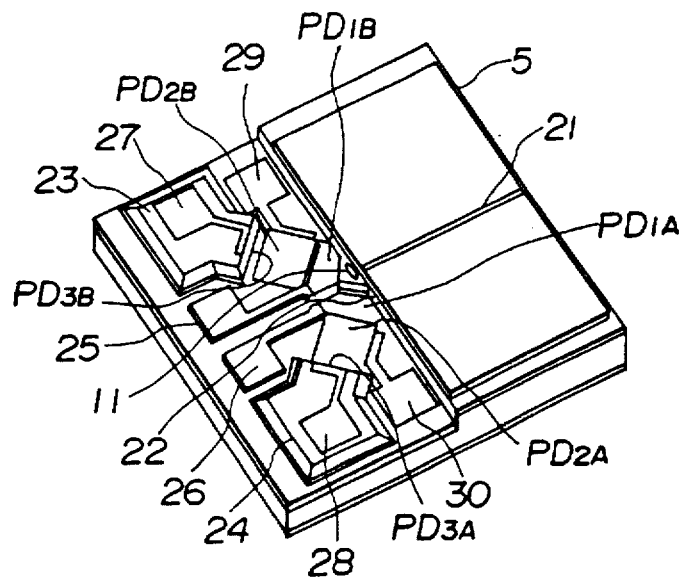

Referring first to FIG. 15, epitaxial growth is carried out for forming the substrate 5, as a laser diode (epitaxial growth of the first period). Then, after etching a striped area 21, as shown in FIG. 16, epitaxial growth is carried out for forming a laser diode (epitaxial growth of the second period). On the epitaxial substrate 5, formed by the epitaxial growth of the second period, anisotropic etching, such as RIE, is carried out as shown in FIG. 18 for forming a cavity mirror 22 on an end face of the striped portion 21 facing the mid part of the substrate 5. The cavity mirror 22 is then coated as shown in FIG. 19, and RIE anisotropic etching is then carried out as shown in FIG. 20 for forming base portions of the oblique mirrors 11, 23, 24. Then, epitaxial growth is carried out as shown in FIG. 21 for forming the reflective mirror 11 and the oblique mirrors 23, 24. Zinc diffusion is then carried out as shown in FIG. 21 for forming $PD_{1A}$, $PD_{2A}$ $PD_{3A}$, $PD_{1B}$, $PD_{2B}$, $PD_{3B}$, operating as light receiving portions, as shown in FIG. 22. The respective surfaces of the photodiodes $PD_{1A}$, $PD_{2A}$ $PD_{3A}$, $PD_{1B}$, $PD_{2B}$, $PD_{3B}$ are coated with low reflectance coating or polarizing coating, as shown in FIG. 23. Thin metal coating is then carried out for forming mirror surfaces on the reflective mirror 11 and the oblique mirrors 23, 24, as shown in FIG. 24. Finally, electrodes 25 to 30 are formed by thin metal film coating as shown in FIG. 25 for completing the optical apparatus.

With the optical apparatus of the second embodiment, shown in FIGS. 13 and 14, the laser light beam radiated by the laser light source 3 is reflected by the outgoing light reflecting surface $M_1$ of the reflective mirror 11 in a direction substantially at right angles to the substrate 5 so as to be condensed by light condensing means, such as a lens, not shown, for forming a point image in the vicinity of an illuminated object, such as an optical disc, not shown. The return light 2, reflected by the illuminated object, is re-condensed by the light condensing means, and reflected by the first and second reflecting surfaces $M_A$, $M_B$ of the reflecting mirror 11. The laser light reflected by the first reflecting surface $M_A$ is received by the photodiodes $PD_{1A}$, $PD_{2A}$ $PD_{3A}$, while the laser light reflected by the second reflecting surface $M_B$ is received by the photodiodes $PD_{1B}$, $PD_{2B}$, $PD_{3B}$.

Figure 26:
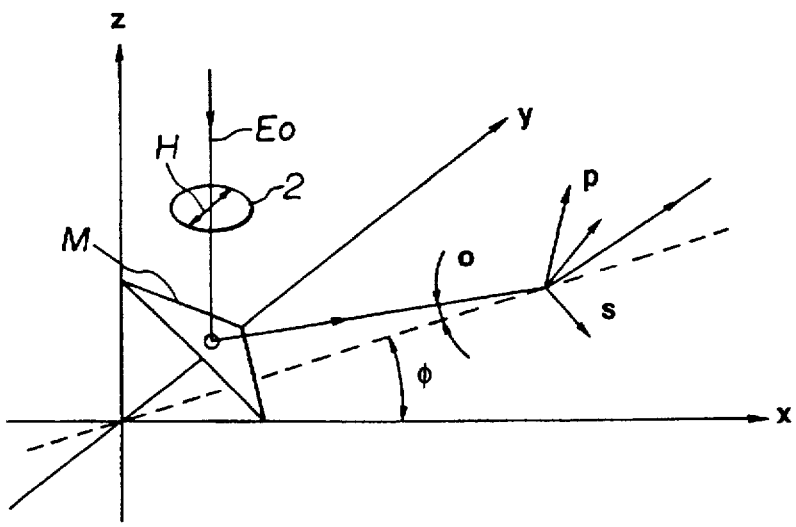
FIG. 26 illustrates the principle of separation of polarized light.
Figure 27:
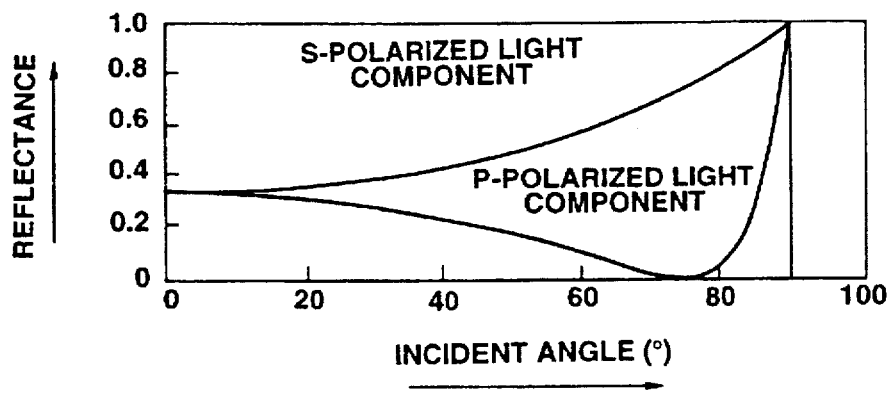
FIG. 27 is a graph showing the relation between the angle of light incidence and light transmittance of the P-polarized light component or the S-polarized light component, with the light incident surface being of GaAs.
Figure 28:
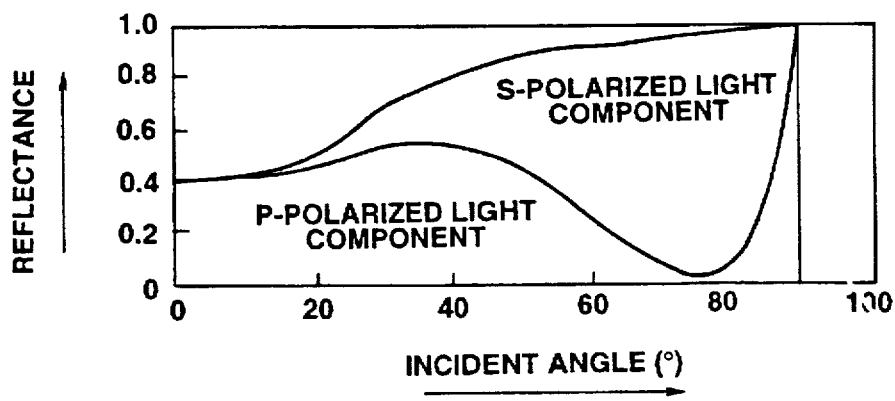
FIG. 28 is a graph showing the relation between the angle of light incidence and light transmittance of the P-polarized light component or the S-polarized light component, with the light incident surface being a multi-layer film provided on GaAs.

The P-polarized light component is selectively detected by the photodiodes $PD_{1A}$, $PD_{2A}$, $PD_{1B}$, $PD_{2B}$, while the S-polarized light component is selectively detected by the photodiodes $PD_{3A}$, $PD_{3B}$. The principle of separation of polarized light beams is explained. FIG. 26 shows the principle of separation of polarized light beams. FIGS. 27 and 28 show the transmittance of the P-polarized light and the S-polarized light when the angle of incidence of the light on a GaAs incident surface is changed and when the light incident surface is formed on GaAs in a multi-layer film configuration, respectively.

In FIG. 26, the XY lane is the surface of separation of the polarized light beams. A reflecting surface M is provided by rotation through an angle $\phi$ with respect to the direction of light polarization H. The reflecting surface M is provided so that the angle of incidence of the light incident after reflection on the separating surface for the polarized light beams will be equal to $\theta$. In FIG. 26, the optical axis of the return light from the illuminated object is denoted by $E_0$.

Referring to FIG. 26, the return light 2 having the direction of polarization H becomes, after reflection on the reflecting surface M, a light beam having the direction of polarization H', which falls on the separating surface for the polarized light beams. One of the P-polarized light beam or the S-polarized light beam is transmitted through the separating surface for the polarized light beams to assure separation of the polarized light beams. It is seen from FIGS. 27 and 28 that separation of the polarized light beams may be realized efficiently if the multi-layer film is used for the incident surface. The angle of incidence to the separating surface for the polarized light beams is preferably 50° to 80° and more preferably in the vicinity of the angle of polarization for which the reflectance for the P-polarized light beam becomes theoretically equal to zero.

A variety of signals, detected on separation of the return light 2 into polarized light components in accordance with the above-described polarized light separating method, may be found as shown by the following equations (1) to (4):

RF signal: $(I_{1A}+I_{2A}+I_{3A})+(I_{1B}+I_{2B}+I_{3B})$     (1)

photomagnetic signal: $(I_{1A}+I_{2A}-I_{3A})+(I_{1B}+I_{2B}-I_{3B})$     (2)

focusing error signal: $(1_{1A}-1_{2A})+(1_{1B}-1_{2B})$     (3)

tracking error signal: $(I^{1A}+I_{2A}+I_{3A})-(I_{1B}+I_{2B}+I_{3B})$     (4)

where the intensity of the photoelectric current obtained at the photodiode $PD_n$ is the photoelectric current $I_n$.

If the optical axis of the return light is split by the reflecting mirror 11 into, for example, two, the light beams incident on the surfaces of photodiodes arranged on the separate optical axes are separated into separate polarized light beams and only one of these polarized light beams is detected, the separation into the polarized light beams may be achieved efficiently by separating the optical axis into two at an angle of 90° relative to each other.

The light volume reflected by the reflecting surface for the received light of the return light may be advantageously increased as compared to that achieved with the usual knife edge method or the above-described first embodiment. That is, the outgoing light reflecting surface and the light receiving reflecting surface are formed on the same reflecting mirror and the optical axis of the outgoing light reflecting portion needs to be shifted towards the outgoing light reflecting surface for efficient reflection of the outgoing light from the light radiation portion. The result is that the rate of reflection on the reflecting surface of the reflecting mirror of the second embodiment for the return light is larger than the rate of reflection on the reflecting surface of the reflecting mirror of the first embodiment for the return light, that is, the amount of the return light that can be furnished to the incoming light reflecting surface is larger in the second embodiment than in the first embodiment.

Although the photodiodes are configured for separating polarized light beams from each other for detecting photomagnetic signals from the magneto-optical disc, this configuration is applicable to detection of the reflected light intensity signal from the optical disc. In this case, there is no necessity for forming or depositing on the surfaces of the respective photodiodes a coating film or a metal grid capable of selectively reflecting one of the polarized light beams for transmitting only the remaining polarized light component.

Figure 29:
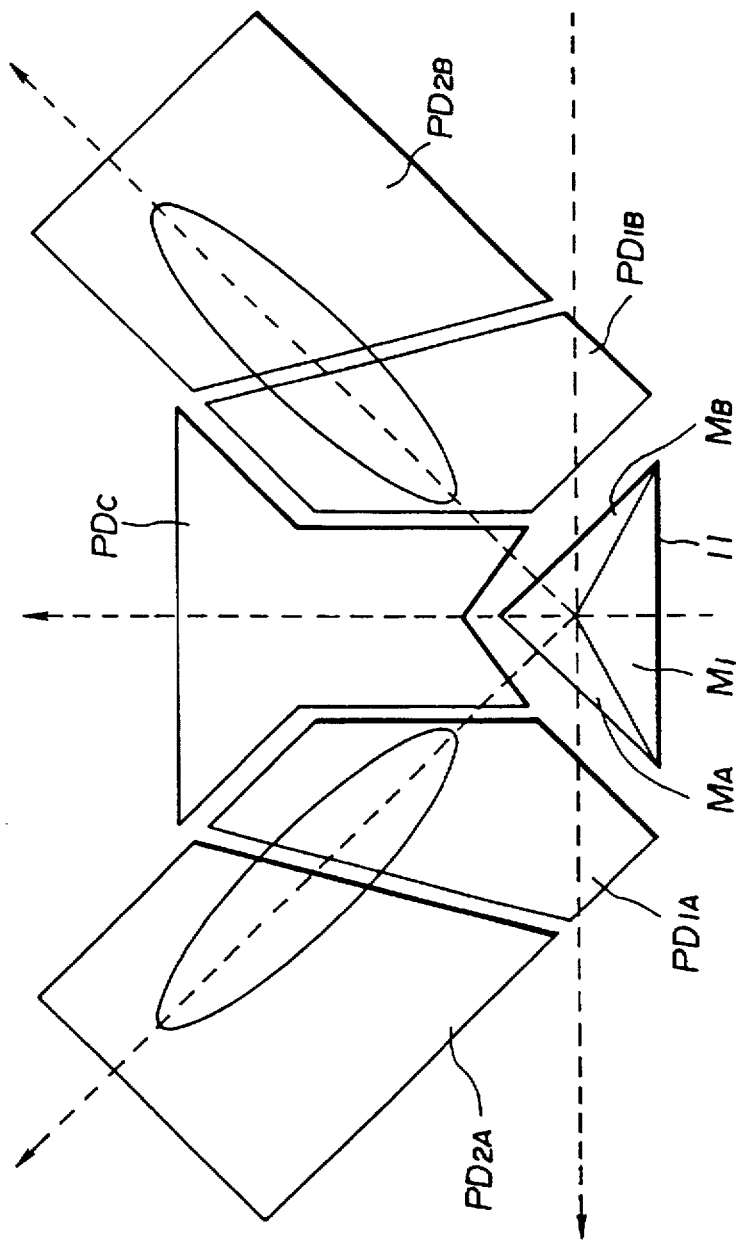
FIG. 29 shows another example of application of an optical element having a shape similar to that of a reflective mirror of the optical apparatus of the second embodiment.

FIG. 29 shows an embodiment of an optical apparatus employing a reflective mirror having the same shape as that of the optical apparatus of the second embodiment described above.

This optical apparatus includes a reflective mirror 11, as a reflecting portion arranged in the vicinity of a focal point of the return light obtained on reflection by the illuminated object of the outgoing light from the light radiating portion, and photodiodes $PD_{1A}$, $PD_{2A}$, $PD_{1B}$ and $PD_{2B}$, as light receiving portions arranged facing the first and second light reflecting surfaces $M_A$ and $M_B$. The first and second light reflecting surfaces $M_A$ and $M_B$ are arranged for reflecting part of the return light for signal detection by the light receiving portion.

The optical apparatus shown in FIG. 29 differs from the apparatus shown in FIGS. 13 and 14 in that the photodiodes are changed in shape and a new photodiode $PD_C$ is employed.

Thus the boundary between the photodiodes $PD_{1A}$ and $PD_{2A}$ is inclined relative to the optical axis of the reflected light from the first reflection surface $M_A$, so that, even if the optical axis of the reflected light is deviated in a direction indicated by arrow c as a result of disc skew or tilt, the rate of light received by the photodiodes $PD_{1A}$ and $PD_{2A}$ remains unchanged. The same holds true for the photodiodes $PD_{1B}$ and $PD_{2B}$.

Also, by adding the photodiode $PD_C$, return light may be detected even if the operating range is outside the pre-set operating range of the focusing servo system and the return light is defocused strongly. The signal derived from the intensity of light detected by the photodiode $PD_C$ is employed as a focusing error signal independently of the signal derived from the intensity of light detected by the remaining photodiodes.

Figure 30:
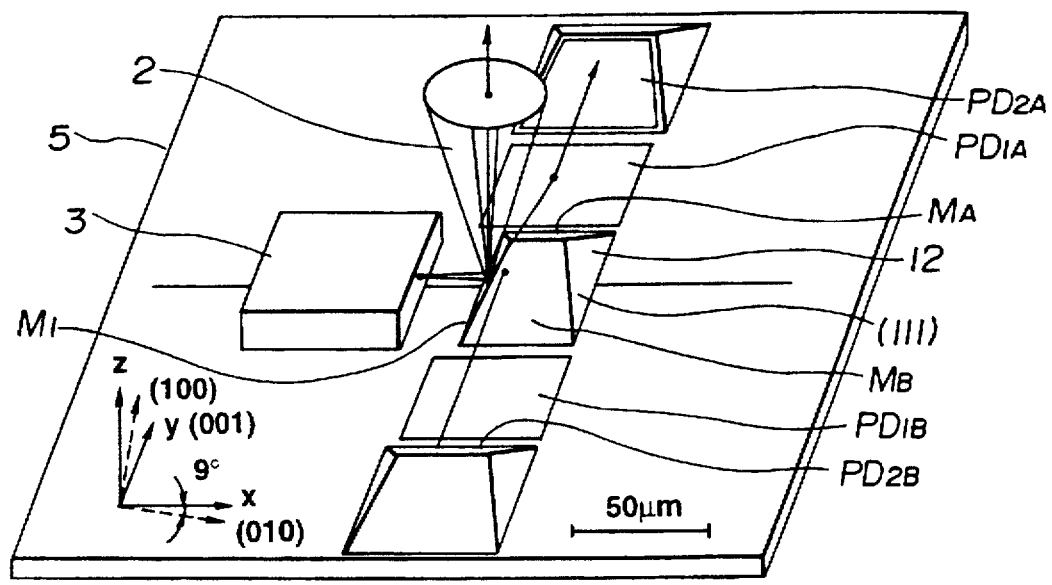
FIG. 30 is a perspective view showing an optical apparatus employing an optical element according to a third embodiment of the present invention.
Figure 31:
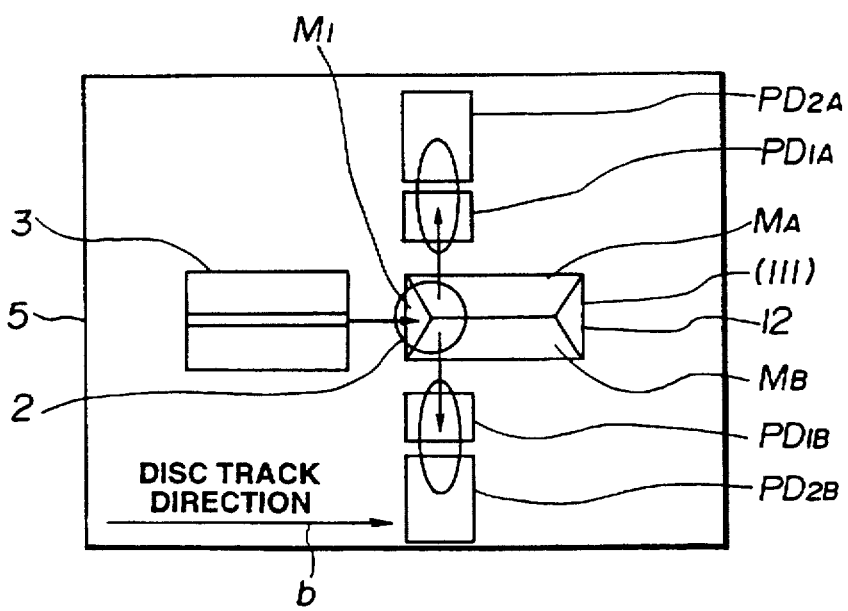
FIG. 31 is a schematic plan view of the optical apparatus according to the third embodiment.

Referring to FIGS. 30 and 31, the essential portions of the optical apparatus, as a third embodiment of the preset invention, is shown schematically in FIG. 30. This optical apparatus is shown in a schematic plan view in FIG. 31.

The optical apparatus of the third embodiment includes a reflective mirror 12, as a reflecting portion arranged in the vicinity of a focal point of the return light obtained on reflection by the illuminated object of the outgoing light from the laser light source, as the light radiating portion, and photodiodes $PD_{1A}$, $PD_{2A}$, $PD_{1B}$ and $PD_{2B}$, as light receiving portions arranged facing the first and second light reflecting surfaces $M_A$ and $M_B$ of the reflecting portion. The first and second light reflecting surfaces $M_A$ and $M_B$ are arranged for reflecting part of the return light for signal detection by the light receiving portion.

In the optical apparatus of the third embodiment, a reflecting mirror 12 formed of, for example, GaAs, and having crystal planes (1-1-1), (11-1), (1-11) and (111), is arrayed on the substrate 5 of, for example, GaAs, inclined approximately 9° from the crystal plane (100) in the direction of the crystal plane (100). The crystal planes (1-1-1), (1-11) and (11-1) constitute the outgoing light reflecting surface $M_1$ facing the laser light source 3 and the first and second light reflecting surfaces $M_A$, $M_B$, respectively. A pair of photodiodes $PD_{1A}$ and $PD_{2A}$ are arranged in this order for facing the first reflecting surface $M_A$ along the optical path beginning from the position of the reflecting mirror 12, while a pair of photodiodes $PD_{1B}$ and $PD_{2B}$ are arranged in this order for facing the second reflecting surface $M_B$ along the optical path beginning from the position of the reflecting mirror 12. The photodiodes $PD_{2A}$ and $PD_{2B}$ are arranged on the crystal planes (11-1) and (1-11) formed on the substrate 5, respectively.

The optical apparatus of the third embodiment may be fabricated by a method similar to that for fabricating the apparatus of the second embodiment.

With the optical apparatus of the third embodiment, the laser light beam radiated from the laser light source 3 is reflected by the outgoing light reflecting surface $M_1$ on the reflecting mirror 12 in a direction substantially at right angles to the substrate 5 so as to be condensed by light condensing means, such as a lens, not shown, for forming a point image in the vicinity of the illuminated object, such as an optical disc, not shown. The return light 2, reflected by the illuminated object, is again condensed by the light condensing means so as to be reflected by the first and second light reflecting surfaces $M_A$ and $M_B$ of the reflecting mirror 12. The laser light reflected by the first reflecting surface $M_A$ is received by the photodiodes $PD_{1A}$ and $PD_{2A}$, while the laser light reflected by the second reflecting surface $M_B$ is received by the photodiodes $PD_{1B}$ and $PD_{2B}$. A variety of signals, detected by the return light 2, may be found as shown by the following equations (5) to (7):

RF signal: (I1A+I2A)+(I1B+I2B)  (5)

focusing error signal: (I1A−I2A)+(I1B−I2B)  (6)

tracking error signal: (I1A+I2A)−(I1B+I2B)  (7)

where the intensity of the photoelectric current obtained at the photodiode $PD_n$ is the photoelectric current $I_n$.

As in the case of the optical apparatus of the second embodiment, the light volume reflected by the reflecting surface for the received light in the return light may be advantageously increased as compared to that achieved with the usual knife edge method or the above-described first embodiment. That is, the outgoing light reflecting surface and the light receiving reflecting surface (reflecting surface for incoming light) are formed on the same reflecting mirror such that the center of the optical axis needs to be shifted towards the outgoing light reflecting surface for efficient reflection of the outgoing light from the light radiation portion. The result is that the rate of reflection on the reflecting surface of the return light of the reflecting mirror of the third embodiment is larger than the rate of reflection on the reflecting surface of the return light of the reflecting mirror of the first embodiment, that is, the amount of the return light that can be furnished to the incoming light reflecting surface is larger in the third embodiment than in the first embodiment.

In the present third embodiment, the photodiodes $PD_{2A}$ and $PD_{2B}$ are provided three-dimensionally, that is provided on inclined surfaces facing the first and second light reflecting surfaces $M_A$ and $M_B$. However, the photodiodes $PD_{2A}$ and $PD_{2B}$ may also be provided on the same plane, that is on the same plane as that on which the photodiodes $PD_{1A}$ and $PD_{1B}$ are formed.

Figure 32:
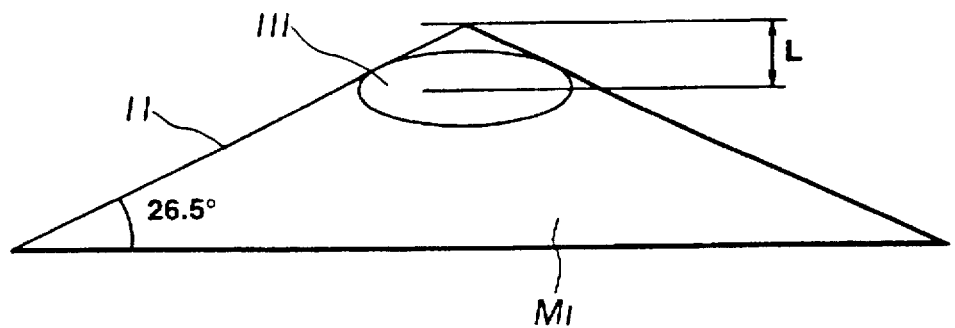
FIG. 32 shows a reflective mirror employed in the optical apparatus of the second embodiment, looking from the laser light source.
Figure 33:
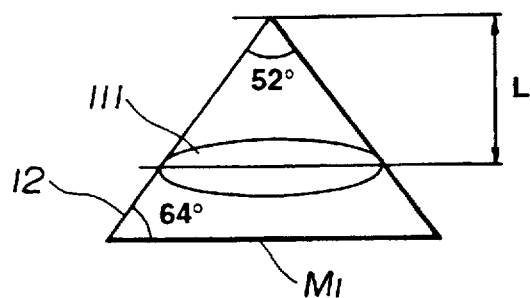
FIG. 33 shows a reflective mirror employed in the optical apparatus of the third embodiment, looking from the laser light source.

FIG. 32 shows the reflective mirror 11 employed for the optical apparatus of the second embodiment, as viewed from the laser light source. FIG. 33 shows the reflective mirror 12 employed for the optical apparatus of the third embodiment, as viewed from the laser light source. The shape of the outgoing light when falling on the reflecting surface $M_1$ is shown as an incident light 111. The linear distance from the apex to the center of the incident light, that is an offset, is shown as a distance L.

It is seen from FIGS. 31 and 32 that the incident light 111 is not encompassed by the reflecting surface $M_1$ if the light is incident in a range corresponding to the above offset. The light portion not encompassed by the reflecting surface represents a loss of light volume to be illuminated on the illuminated object, such as a recording medium. Thus, if the offset is larger, there is a risk of the lowering of the return light detection efficiency. Thus it is desirable to improve the reflecting mirror 12 shown in FIG. 32.

Figure 34:
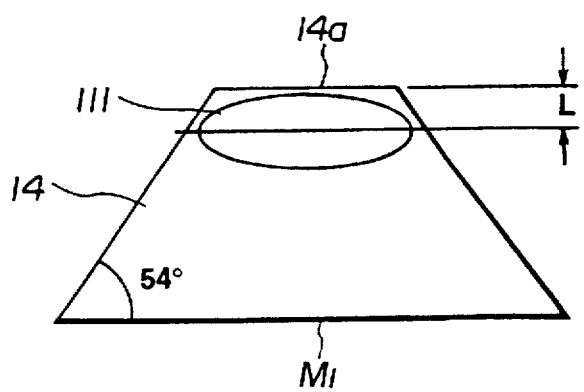
FIG. 34 shows a reflective mirror employed in the optical apparatus of the fourth embodiment, looking from the laser light source.

FIG. 34 shows a reflecting mirror, which possibly improves the reflective mirror of the third embodiment. In FIG. 34, the reflective mirror is viewed from the laser light source. With the reflective mirror, there is no risk of the laser light being incident with the angle of the above offset and hence there is no risk of the efficiency being lowered.

Figure 35:
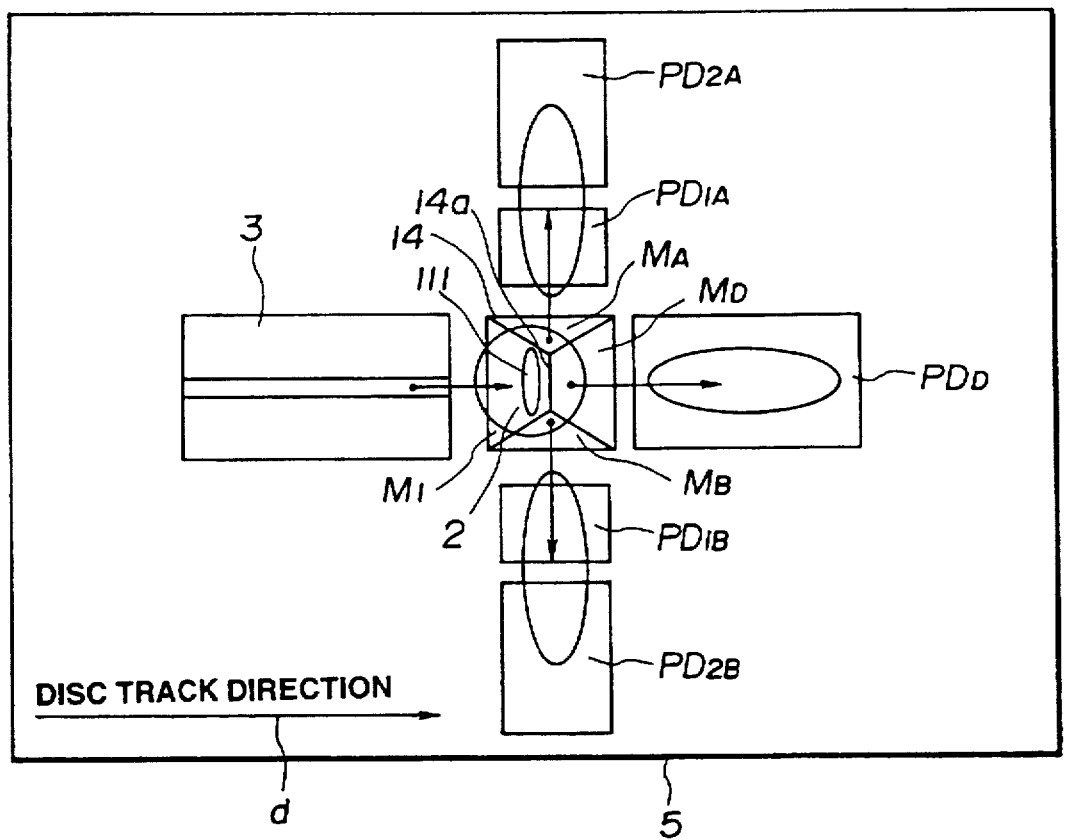
FIG. 35 is a perspective view showing an optical apparatus employing an optical element according to a fourth embodiment of the present invention.

FIG. 35 shows an optical apparatus employing the reflective surface 14 shown in FIG. 34, as a fourth embodiment of the present invention.

The optical apparatus of the fourth embodiment includes a reflective mirror 14, as a reflecting portion arranged in the vicinity of a focal point of the return light 2 obtained on reflection by the illuminated object of the outgoing light from the laser light source, as the light radiating portion, and photodiodes $PD_{1A}$, $PD_{2A}$, $PD_{1B}$ and $PD_{2B}$, as light receiving portions arranged facing the first and second light reflecting surfaces $M_A$ and $M_B$ of the reflecting portion. The first and second light reflecting surfaces $M_A$ and $M_B$ are arranged for reflecting part of the return light for signal detection by the light receiving portion.

With the fourth embodiment, the roof-shaped reflective mirror 14 having crystal planes (111), (11-1), (-1-11) and (1-11) defining a horizontal ridge 14a is arranged on a substrate 5 of, for example, GaAs, having a crystal plane (100) as a major surface. The crystal plane (111) forms a outgoing light reflecting surface $M_1$ facing the laser light source 3, and the crystal plane (11-1) forms the first reflecting surface $M_A$, while the crystal plane (1-11) forms the second reflecting surface $M_B$ and the crystal plane (-1-11) forms the third reflecting surface $M_D$. The photodiode $PD_{1A}$ and $PD_{1B}$ are arranged facing the first reflective surface $M_A$, while the photodiodes $PD_{1B}$, $PD_{2B}$ are arranged facing the second reflective surface $M_B$ and the photodiode $PD_D$ is arranged facing the third reflective surface $M_D$.

With the present fourth embodiment, the outgoing laser light beam 111, as the laser light beam radiated by the laser light source 3, is reflected by the outgoing light reflecting surface $M_1$ in a direction substantially at right angles to the substrate 5 so as to be condensed by light condensing means, such as a condensing lens, not shown, for forming a point image in the vicinity of an illuminated object, such as an optical disc, not shown. The return light 2, reflected by the illuminated object, is re-condensed by the light condensing means, so as to be incident on the reflecting mirror 14. The return light beam 2 is then reflected by the first reflecting surface $M_A$, second reflecting surface $M_B$ and the third reflecting surface $M_D$ so as to be received by the photodiodes arranged facing the reflecting surfaces.

If the intensity of the photoelectric current received by the photodiode $PD_n$ is $I_n$, the RF signal, focusing error signal and the tracking error signal may be found by the following equations (8) to (10):

$$\text{RF signal: } I_3 \text{ or } (I_A - I_{2A}) + (I^{1B} - I_{2B}) + I_3 \quad (8)$$

$$\text{focusing error signal: } (I_{1A} - I_{2A}) + (I_{1B} - I_{2B}) \quad (9)$$

$$\text{tracking error signal: } (I_{1A} + I_{2A}) - (I^{1B} + I_{2B}) \quad (10)$$

As in the case of the second and third embodiments, the light volume reflected by the reflecting surface for the received light of the return light may be advantageously increased as compared to that achieved with the usual knife edge method or the above-described first embodiment. That is, the outgoing light reflecting surface and the light receiving reflecting surface are formed on the same reflecting mirror, such that the center of the optical axis needs to be shifted towards the outgoing light reflecting surface for efficient reflection of the outgoing light from the light radiation portion. The result is that the rate of reflection on the reflecting surface for the return light of the reflecting mirror of the fourth embodiment is larger than that on the reflecting surface for the return light of the reflecting mirror of the first embodiment, that is, the amount of the return light that can be furnished to the incoming light reflecting surface is larger than in the first embodiment.

Figure 36:
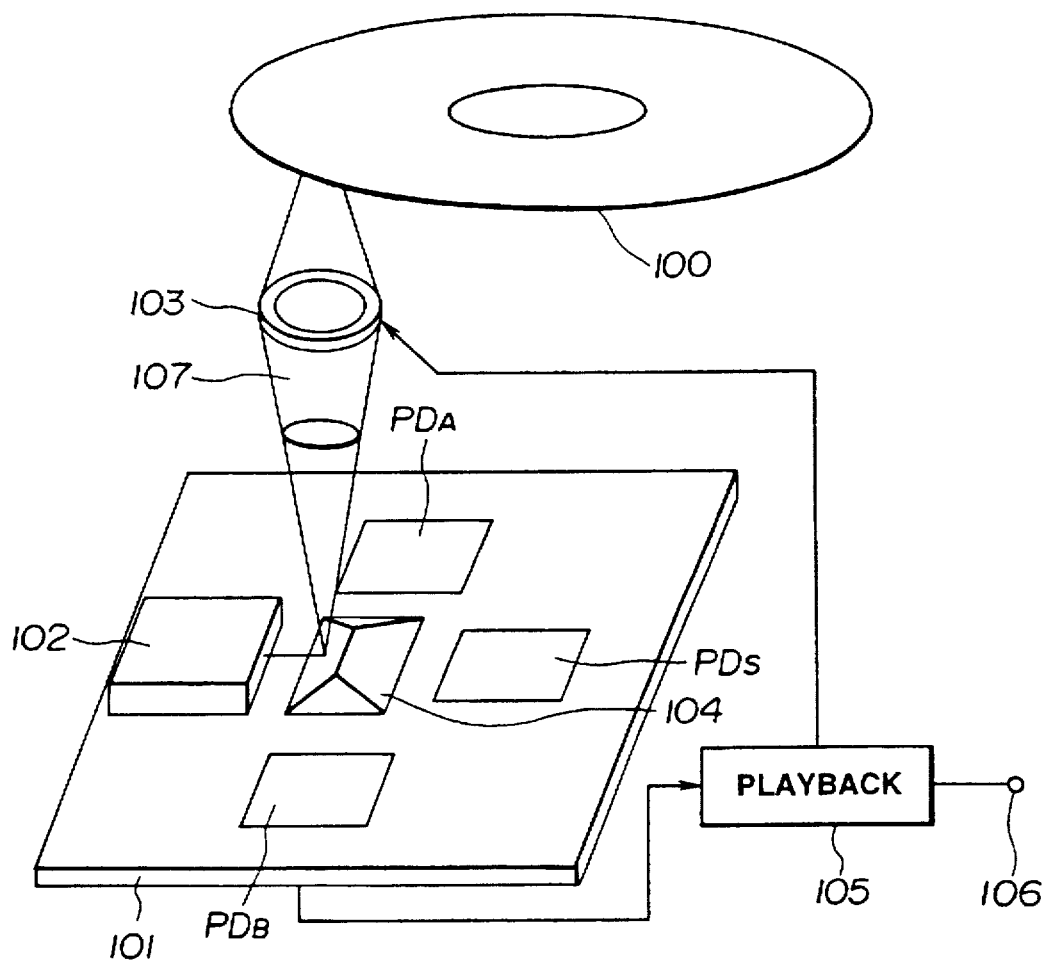
FIG. 36 shows an example of a recording medium reproducing apparatus according to the present invention.
Figure 37:
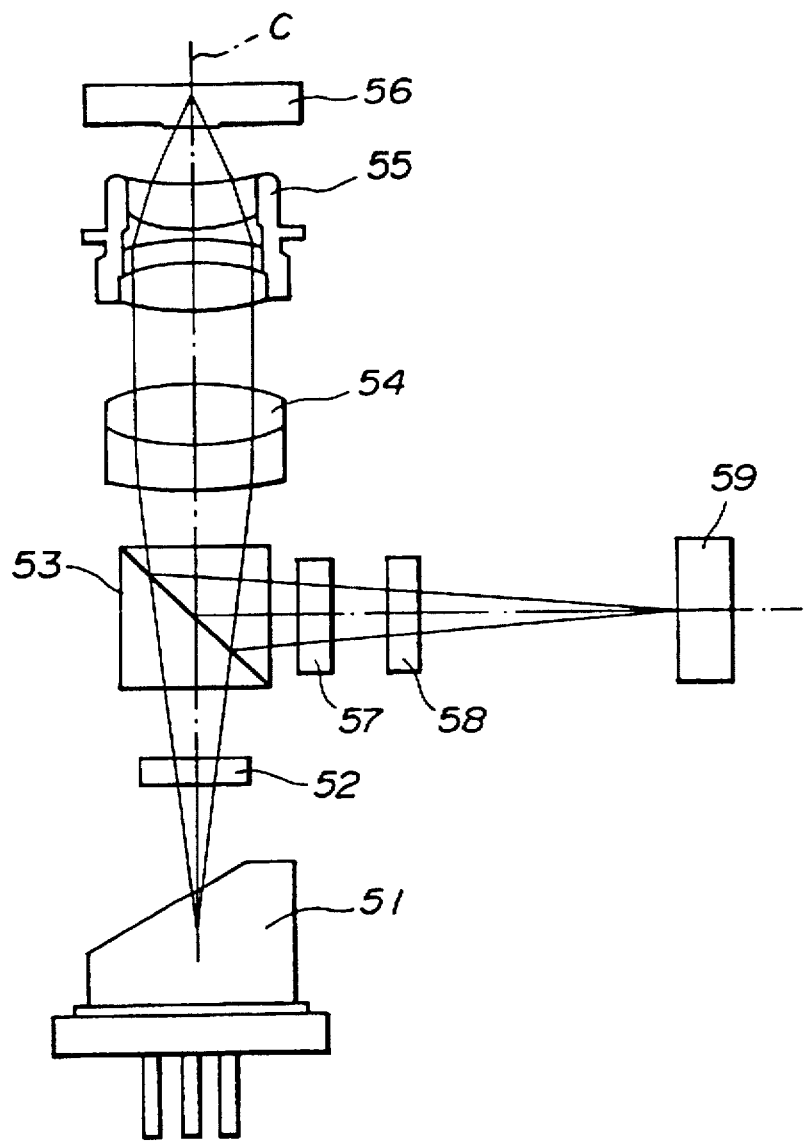
FIG. 37 shows an example of an optical apparatus employing a conventional optical element.
Figure 38:
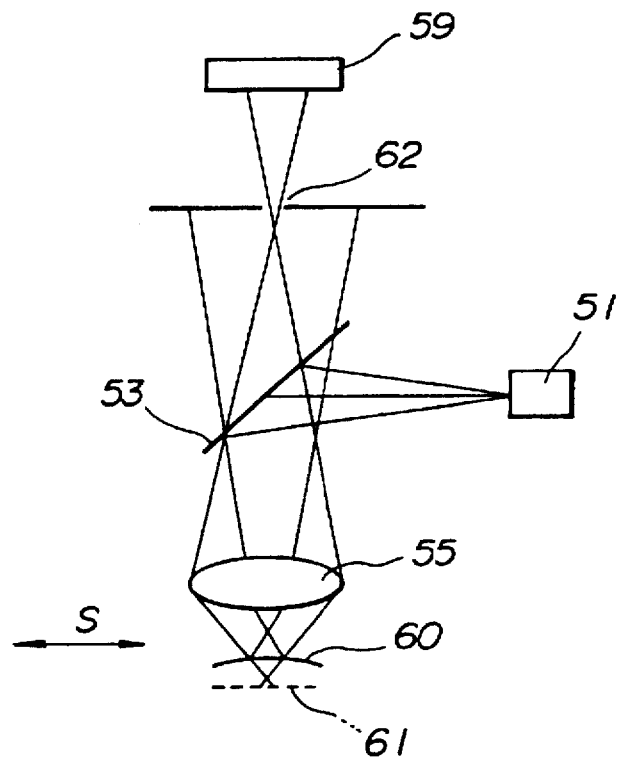
FIG. 38 shows another example of an optical apparatus employing a conventional optical element.

FIG. 36 shows a recording medium reproducing apparatus configured for detecting a return illuminating light beam 107 reflected from an optical recording medium 100 according to the present invention. The recording and/or reproducing apparatus includes a light radiation portion 102 for radiating a light beam illuminated on the optical recording medium 100, and an objective lens 103, as light condensing means, for condensing the light radiated from the light radiating means 102 on the optical recording medium 100. The recording and/or reproducing apparatus also includes a reflective mirror 104, as a reflecting portion, arranged in the vicinity of the focal point of the return light beam 107, and photodiodes $PD_A$, $PD_B$ and $PD_S$ arranged facing the light-receiving reflecting surface of the reflecting portion. In addition, the recording and/or reproducing apparatus includes an optical apparatus 101 arranged for reflecting a portion of the return light 107 for detecting the signal by the light receiving portion, and a reproducing unit 105 for reproducing the contents of the optical recording medium 100 based upon the signals detected by the optical apparatus 101.

With the above-described recording and/or reproducing apparatus, the laser light beam from the light radiating portion 102 arranged within the optical apparatus 101 is reflected by the outgoing light reflecting surface of the reflecting mirror 104 so as to be radiated in a direction substantially at right angles to the optical apparatus 101. This laser light beam is condensed by the objective lens 103 on the optical recording medium 100 and reflected back as the return light beam 107 which forms a point image in the vicinity of the reflective mirror 104. The return light beam is incident on the light receiving reflecting surface of the reflective mirror 104. The reflected return light is incident on the photodiodes $PD_A$, $PD_B$ and $PD_S$ which then detect the incident light. If, for example, the optical recording medium is a disc, the operation of the objective lens 103 is controlled responsive to servo signals as later explained by a so-called bi-axial device or an actuator whereby the objective lens is shifted in radial and vertical directions with respect to the disc-shaped recording medium.

The signals detected by the photodiodes are provided to the reproducing unit 105 which then performs a reproducing operation on the basis of these detected signals. The reproduced signals are outputted at a reproducing signal output terminal 106.

In the recording and/or reproducing apparatus, in which the operation of the actuator for the objective lens 103 is controlled by the servo signals from the reproducing unit 105, such as the focusing or tracking servo signals, these focusing or tracking error signals are derived from focusing error signals or tracking servo signals produced on the basis of the values of light intensity detected by the photodiodes $PD_A$, $PD_B$. The RF signals are detected by the photodiode $PD_S$.

The optical device 101 may be any of the above-enumerated optical devices according to the present invention.

Although the recording medium reproducing apparatus is shown in FIG. 36, the optical apparatus of the present invention may also be used as a sensor for detecting the distance from the illuminated object using the above-described focusing error signal detection method.

In the above-described optical apparatus, renewed alignment operations may be eliminated since the laser light source 3, as a light radiating portion, reflecting mirrors 1, 11, 12 and 14, configured for reflecting the direct return light from the laser light source 3, and the respective photodiodes, are arranged on the same substrate 5. In addition, the RF signals, focusing error signals and the tracking error signals may be detected by detecting the return light by the photodiodes.

The renewed alignment operations may similarly be eliminated by separating the laser light beam into polarized light components and detecting the polarized light components by the photodiodes, while the photomagnetic signals may also be detected, in addition to the RF signals, focusing error signals and the tracking error signals, by detecting the return light by the photodiodes.

In addition, by employing the shapes of the reflecting mirrors 11, 12 and 14, the light volume produced on reflection by the outgoing light reflecting surface of the outgoing light from the laser light source 3 as the light radiating portion is not decreased, while the volume of reflected light by the light receiving reflecting surface is increased for raising the power efficiency. That is, the outgoing light reflecting surface and the incoming light reflecting surface are formed on the same reflecting mirror, such that the center of the optical axis needs to be shifted towards the outgoing light reflecting surface for efficient reflection of the outgoing light from the light radiation portion. The result is that the rate of reflection on the reflecting surface of the return light of the reflecting mirror of the second to fourth embodiments is larger than that on the reflecting surface of the return light of the reflecting mirror of the first embodiment, that is, the amount of the return light that can be furnished to the incoming light reflecting surface is larger in the second to fourth embodiment than in the first embodiment.

What is claimed is:

1. An optical apparatus, comprising:

a light radiating portion;

a reflecting portion having at least an outgoing light reflecting surface for reflecting an outgoing light from said light radiating portion, a light receiving reflecting surface, and an edge between said outgoing light reflecting surface and said light receiving reflecting surface; and at least one light receiving portion;

wherein said reflecting portion is arranged in the vicinity of an image point of a return light beam which is a light beam from the light radiating portion reflected by an illuminated object;

said light radiating portion is arranged facing said outgoing light reflecting surface and said light receiving portion is arranged facing said light receiving reflecting surface; and said light receiving reflecting surface reflects a portion of said return light beam and detects a signal using said edge as a knife edge.

2. The optical apparatus as claimed in claim 1, wherein said reflecting portion comprises two or more light receiving reflecting surfaces and signals from said light receiving reflecting surfaces are compared to each other for detecting a tracking error signal.

3. The optical apparatus as claimed in claim 1 wherein said light receiving portion has at least two light receiving elements and at least one of the light receiving elements is a light receiving element for detecting polarized light components separated from the light beam from said illuminated object.

4. The optical apparatus as claimed in claim 3 wherein photomagnetic signals are detected by said at least two light receiving elements.

5. The optical apparatus as claimed in claim 1 wherein said light receiving reflecting surface of the reflecting portion has a first reflecting surface and a second reflecting surface and wherein said light receiving portion includes a first light receiving part and a second light receiving part facing said first reflecting surface and said second reflecting surface, respectively.

6. The optical apparatus as claimed in claim 5 wherein signals from said first and second light receiving parts are compared to each other for detecting a tracking error signal.

* * * * *